(12) United States Patent
Hirose et al.

(10) Patent No.: US 7,640,665 B2
(45) Date of Patent: Jan. 5, 2010

(54) METHOD OF MANUFACTURING SHAFT UNIT

(75) Inventors: Kenzo Hirose, Sakai (JP); Kiyoyoshi Takegami, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 839 days.

(21) Appl. No.: 11/306,664

(22) Filed: Jan. 6, 2006

(65) Prior Publication Data

US 2006/0254043 A1    Nov. 16, 2006

(30) Foreign Application Priority Data

Jan. 6, 2005    (JP)    ............... 2005-001100

(51) Int. Cl.
  *B23P 19/02*    (2006.01)
  *B23P 11/00*    (2006.01)
(52) U.S. Cl. .................. 29/898.02; 29/525; 29/525.13; 29/530; 29/557; 384/100; 72/368
(58) Field of Classification Search ............. 29/603.03, 29/898.02, 469, 525, 527.1, 530, 27 C, 33 T, 29/33 D, 56.6, 557, 558, 732, 737, 525.13, 29/525.15; 310/98; 384/100; 72/367.1, 72/368, 370.1, 370.11, 370.14, 370.27
See application file for complete search history.

(56) References Cited

U.S. PATENT DOCUMENTS

| | | | | |
|---|---|---|---|---|
| 4,349,947 | A | * | 9/1982 | Rood .................. 29/890.07 |
| 5,134,331 | A | | 7/1992 | Miyaji et al. |
| 5,153,470 | A | | 10/1992 | Miyaji et al. |
| 5,307,549 | A | * | 5/1994 | Tsutsumi et al. ........... 29/27 C |
| 5,906,047 | A | * | 5/1999 | Miller et al. ........ 29/890.132 |
| 6,249,944 | B1 | * | 6/2001 | Perkins, Jr. ............... 29/38 B |
| 6,836,388 | B2 | | 12/2004 | Nishimura et al. |
| 2003/0024099 | A1 | | 2/2003 | Gomyo |

FOREIGN PATENT DOCUMENTS

JP    2880563 B2    1/1999

* cited by examiner

*Primary Examiner*—Jermie E Cozart
(74) *Attorney, Agent, or Firm*—Volentine & Whitt, PLLC

(57) ABSTRACT

In a rotor hub manufacturing method, a workpiece is chucked and a hole centering on the workpiece center axis is formed in the workpiece. A sealing member is press-fit into the hole, forming an internal space. A shaft feature is thereafter shaped in the workpiece by cutting work done on the periphery of the workpiece around the hole. The workpiece part including the shaft feature is then cut away from the workpiece to form a rotor hub as a shaft unit.

20 Claims, 24 Drawing Sheets

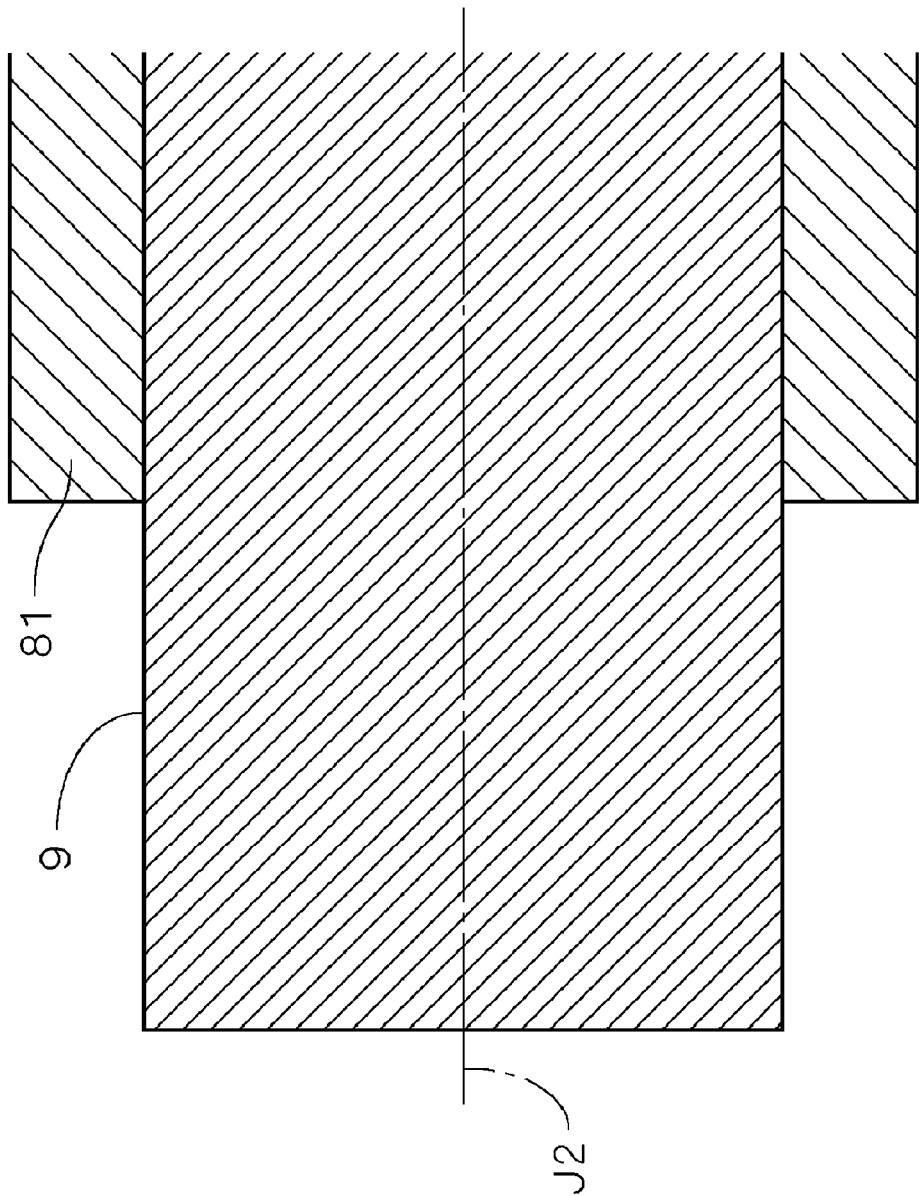

METHOD OF MANUFACTURING SHAFT UNIT

BACKGROUND OF THE INVENTION

1. Technical Field

The present invention relates to methods of manufacturing the shaft unit of an electrically powered motor.

2. Description of the Related Art

Hard-disk drives conventionally are equipped with a spindle motor (also referred to simply as "motor" hereinafter) that rotationally drives the recording disk(s). Such disk-drive motors are provided with a threaded hole into which a clamping member screws for fixing the recording-disk(s) to the motor's rotor hub, which includes a shaft. In some implementations, a shaft-penetrating configuration for the threaded hole is adopted, with the hole being formed heading into the shaft interior through the top endface of the rotor hub.

In implementations in which the threaded hole (or a hole that is linked with the threaded hole) penetrates the shaft, the interior of the motor and the space in which the recording disk(s) is housed communicate via the threaded hole. As a consequence, the space around the recording disk(s), which should stay clean, ends up being invaded by fine particulate matter generated in the motor. This is of particular concern in motors furnished with a fluid dynamic-pressure bearing, in which case the rotor hub is rotationally supported by oil filling a micro-gap in between the shaft and a sleeve for the bearing. In such configurations, the lower end of the shaft is disposed within the oil, which consequently runs the risk that the oil will travel along the inner surface of the threaded hole and invade the recording-disk area of the motor.

To address such problems with rotor hubs of this sort, in which a through-hole is formed in the shaft, technology whereby the through-hole is sealed to keep clean the space in which the recording disk(s) is housed has been proposed. For example, in the spindle-motor rotor hub art, a spherical elastic member of a diameter that is slightly larger than the through-hole diameter is inserted into the through-hole through the lower-end side of the shaft to plug the through-hole.

With regard to sealing the through-hole, in implementations in which, in order further to improve the adherence between the through-hole sealing member and the inner surface of the through-hole, a metal fitting, for example, is press-fitted into the through-hole. In this case, there is a likelihood that the shaft, whose diametric span is not substantial, will end up warping, thereby depriving the structure of the tolerances provided by the high precision under which the shaft was machined.

BRIEF SUMMARY OF THE INVENTION

An object of the present invention is to make available a shaft unit, including at least a shaft of desired conformation, whereby the spaces on either side of the unit's sealing member are reliably isolated from each other.

A method of manufacturing a shaft unit in one example of the present invention comprises: a step of readying as machining stock a workpiece in which is formed a hole having a mouth on one end oriented along the workpiece center axis, in a state in which the workpiece is retained in a retaining component that on the center axis as its rotational center rotates relative to a cutting tool; and a step of inserting a sealing material inside the hole, to seal the hole.

In addition, the manufacturing method just set forth also comprises: a step of performing cutting work on the periphery of the workpiece around the hole to shape a shaft that projects toward the one end with the center axis as its center; and a shaft-unit forming step of forming on the workpiece alongside the other end of the hole with respect to the sealing material a cutting face transecting the center axis, to produce the shaft unit by separating from the workpiece a part thereof including the shaft.

Furthermore, a method of manufacturing a shaft unit in a separate example of the present invention comprises: a step of readying as machining stock a workpiece in which is formed a through-hole centering on the workpiece center axis, in a state in which the workpiece is retained in a retaining component that on the center axis as its rotational center rotates relative to a cutting tool; a step of inserting a sealing material inside the hole, to seal the hole; and a step of performing cutting work on the periphery of the workpiece around the hole to form a shaft, with the center axis as its center, that projects unilaterally with respect to the center axis orientation, and thereby yield a single shaft unit from a single workpiece.

By the present invention, a shaft-unit shaft can be rendered into a desired conformation even as the spaces on either side of the sealing material in the through-hole within the shaft are securely isolated from each other.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIGS. 4A through 4H are section views representing successive stages in the course of manufacturing the first-embodiment rotor hub;

DETAILED DESCRIPTION OF THE INVENTION

Figure 1:
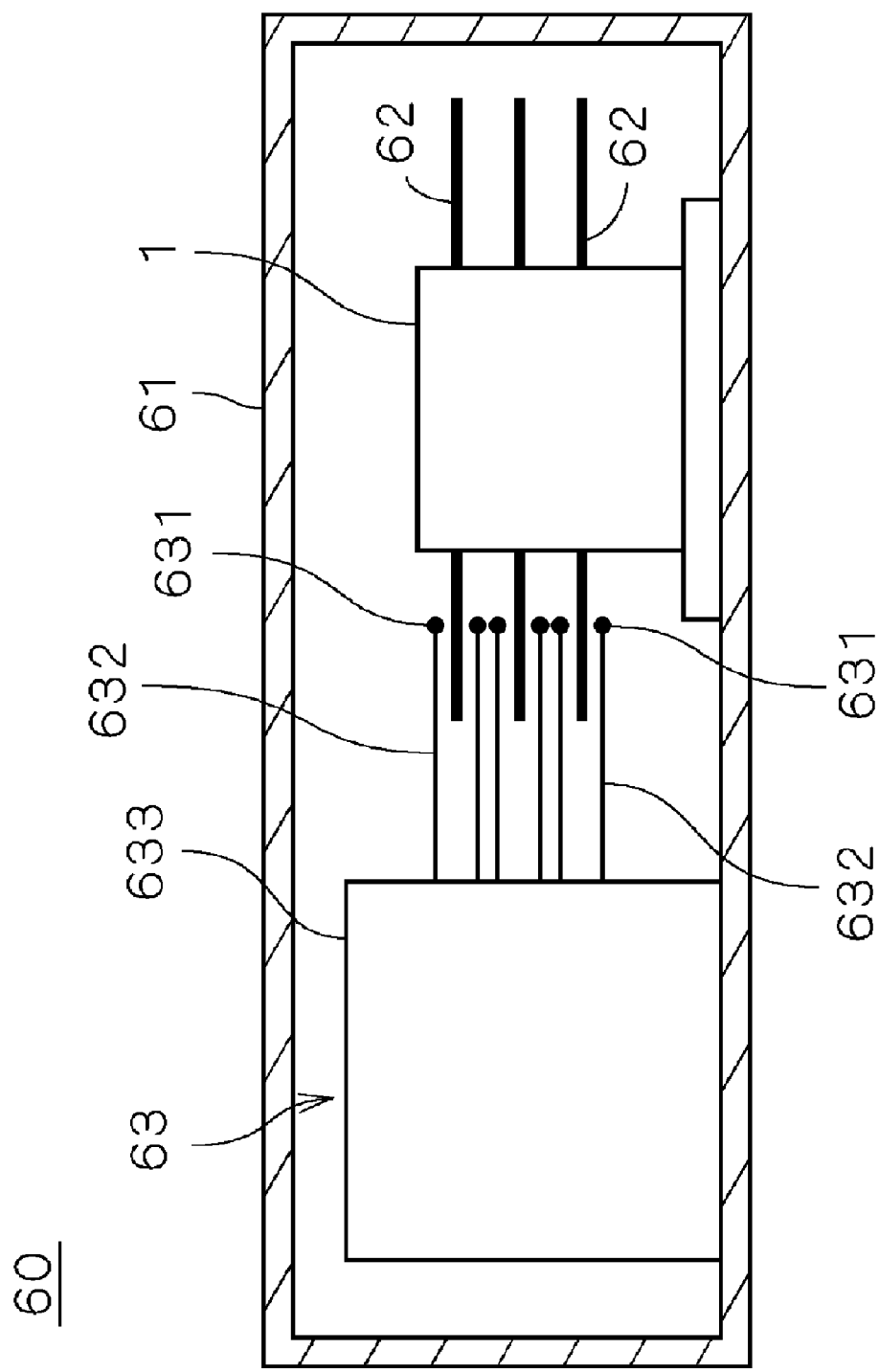
FIG. 1 is a view representing the internal makeup of a disk-drive device of the present invention.

With reference to the several views of the drawings, an explanation of several embodiments of the present invention will be made in the following. It should be understood that in the explanation of the present invention, when positional relationships among and orientations of the different components are described as being up/down or left/right, positional relationships and orientations that are in the drawings are indicated; however, the ultimate positional relationships among and orientations of the components once having been assembled into an actual device might not be indicated.

First Embodiment

Reference is made to FIG. 1, a view representing the internal makeup of a disk-drive device 60 in which an electrically powered spindle motor 1 (termed "motor 1" hereinafter) involving a first embodiment of the present invention is installed. In the present embodiment, the disk-drive device 60 is a hard-disk drive. By virtue of a housing 61, the interior of the disk-drive device 60 is a rendered a clean space where dust and debris are minimized to the utmost, and wherein round platelike recording disks 62 for recording information, an accessing module 63 for reading information from and (or) writing information onto the recording disks 62, and the motor 1, which is for spinning the recording disks 62, are accommodated.

The accessing module 63 includes heads 631 that the module brings near the recording disks 62 to carry out magnetic reading and writing of information, arms 632 that support the heads 631, and a head-shifting mechanism 633 that varies the position of the heads 631 relative to the recording disks 62 by shifting the arms 632. By the configurational organization of these components, the heads 631, brought near the recording disks 62, access the requisite positions on the recording disks 62 to perform the reading and writing of information.

Figure 2:
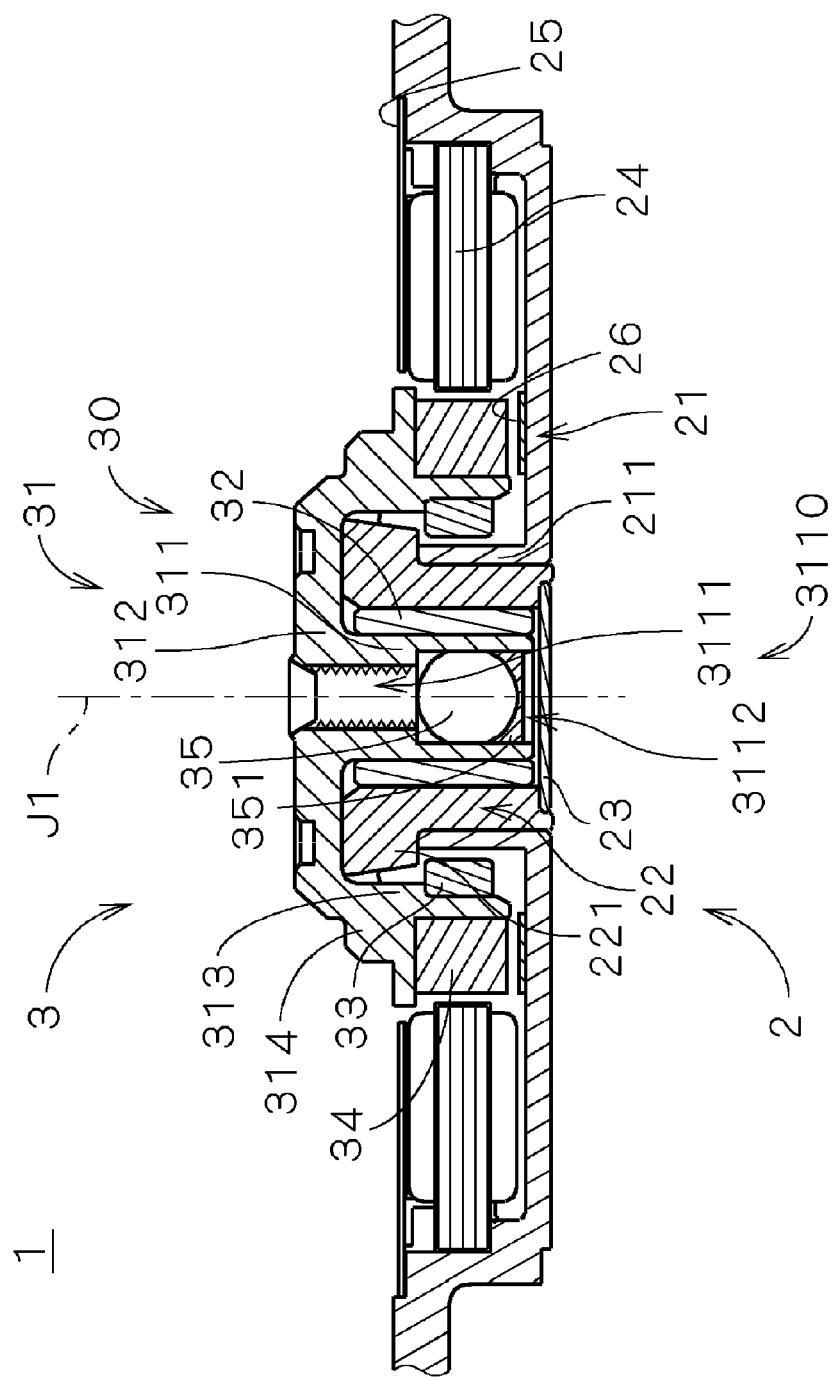
FIG. 2 is a vertical section view illustrating the structure of a motor.

Reference is made to FIG. 2, a vertical section view illustrating the makeup of the disk-driving motor 1. The motor 1 comprises a stationary section 2, which is a stator assembly, and a rotor part 3, which is a rotary assembly. The rotor part 3 is rotatably supported with respect to the stationary section 2 by a bearing mechanism employing hydrodynamic pressure derived from lubricating oil.

The stationary section 2 comprises a baseplate 21, an approximately circular cylindrical sleeve 22 that rotatably supports the rotor part 3, and a stator 24 disposed about the perimeter of the sleeve 22. The lower part of the sleeve 22 is press-fitted and thereby fixed into a sleeve-retaining portion 211 of the baseplate 21, protruding in the form of an approximately circular cylinder from the baseplate central area, and a flange 221 bulging outwardly with respect to center axis J1 forms an integral portion of the upper part of the sleeve 22. The opening along the lower end of the sleeve 22 is closed off by an approximately disk-shaped sealing cap 23.

The stator 24 comprises a core constituted by laminating silicon steel plates, and coils wound onto the magnetic poles of the core, and is anchored to the baseplate 21. Furthermore, the stator 24 coils are connected to a not-illustrated current supply circuit, whereby the supplied electric current is controlled. Over the stator 24 an approximately annular magnetic-shield plate 25 formed of a ferromagnetic substance is provided centering on center axis J1; the magnetic field from the stator 24 is blocked off by the magnetic shield plate 25.

The rotor part 3 is made up of a rotor hub 31 that supports all portions of the rotor part 3, a retaining member 33 that prevents the rotor part 3 from separating from the stationary section 2, and a field magnet 34 that together with the stator 24 generates the rotational force (torque) that spins the rotor part 3.

The rotor hub 31 is made up of an approximately circular cylindrical shaft 311 centering on center axis J1 and projecting downward (i.e., toward the stationary section 2), an approximately disk-shaped circular plate part 312 that perpendicularly with respect to center axis J1 flares from the upper end portion of the shaft 311, and a roughly tubular cylindrical part 313 that projects downward from, along the outer rim of, the circular plate part 312. The rotor hub 31 is formed unitarily from stainless steel, and the portion apart from the shaft 311 is roughly in the form of bowl that opens downward. The upper end of the shaft 311 is its fixed end, while the lower end is its free end. A disk-carrying section 314 that bulges outward is formed on the outer circumferential surface of the cylindrical part 313; the disks 62 (cf. FIG. 1) are set onto the disk-carrying section 314 and fixed to the rotor hub 31 by means of a not-illustrated clamp.

The rotor hub 31 is fashioned in roughly columnar form with center axis J1 as the center, comprises the circular plate part 312, and is furnished with a through-hole 3110 that penetrates the shaft 311. Internal threads into which the clamp screw-fastens are formed in the upper portion of the through-hole 3110. Furthermore, an approximately spherical sealing member 35 made of metal is inserted into the lower portion of the through-hole 3110. In the rotor hub 31, the through-hole 3110 is plugged (i.e., sealed) by the sealing member 35, dividing the through-hole 3110 into an upper space 3111 and a lower space 3112 that are isolated from each other. In addition, the sealing member 35 along the lower space 3112 is further sealed by means of an adhesive 351, wherein the upper space 3111 and the lower space 3112 are more securely isolated from each other. As a result, lubricating oil and other matter in the interior of the motor 1 are positively prevented from invading the space around the recording disks 62, which must be kept clean.

An outer tubular member 32, circularly cylindrical in form, is attached to the outer periphery of the shaft 311. The outer tubular member 32 is adhesively fixed to the outer circumferential surface of the shaft 311, with a journal 30 portion of the rotor part 3 being constituted by the shaft 311 and the outer tubular member 32. The journal 30 is rotatably inserted into the sleeve 22 of the stationary section 2, whereby the rotor hub 31 is supported rotatably with respect to the stationary section 2. Center axis J1 of the shaft 311 (which is the center axis of the journal 30 as well) is the rotational center axis of the rotor part 3.

The retaining member 33, an annular component that is centered on center axis J1, is affixed to the inner circumferential surface of the cylindrical part 313 of the rotor hub 31, such that along the underside of the flange portion 221 of the sleeve 22, the retaining member 33 bulges inward, toward center axis J1. By this configuration the journal 30 is kept from coming out of the sleeve 22.

The field magnet 34, an annular component that is centered on center axis J1, is permanently magnetized with circumferentially alternating poles, and is affixed to the outer circumferential surface of the cylindrical part 313 of the rotor hub 31. The field magnet 34 diametrically opposes the stator 24 across a gap. The magnetic center of the field magnet 34 axially and the magnetic center of the stator 24 axially are approximately coincident. Beneath the field magnet 34, an annular thrust yoke 26 that is ferromagnetic is attached to the bottom portion of the baseplate 21. By the force of magnetic attraction between the field magnet 34 and the thrust yoke 26, the rotor part 3 is drawn toward the baseplate 21.

Next, the bearing mechanism of the motor 1, in which hydrodynamic pressure is employed for rotatably supporting the rotor part 3 on the stationary part 2, will be explained. In the motor 1, micro-gaps are provided between the undersurface of the circular plate part 312 of the rotor hub 31 and the top endface of the sleeve 22, between the inner circumferential surface of the sleeve 22 and the outer circumferential surface of the outer tubular member 32, between the bottom endface of the outer tubular member 32 and the top surface of the sealing cap 23, and between the outer circumferential surface of the flange portion 221 of the sleeve 22 and the inner circumferential surface of the cylindrical part 313 of the rotor hub 31. In the following, these gaps will respectively be referred to as the "upper gap," the "lateral gap," the "lower gap," and the "outside gap." Lubricating oil continuously fills these gaps. In the motor 1, the lower-end mouth of the through-hole 3110 in the shaft 311 is situated within the lubricating oil lying on the sealing cap 23.

The periphery of the sleeve flange portion 221 includes a sloping surface where the peripheral diameter tapers heading axially downward. The cylindrical part 313 is formed with a constant inner diameter along its inner circumferential surface where it opposes the outer circumferential surface of the flange portion 221. This configuration results in the boundary surface of the lubricating oil in the outside gap forming a meniscus by virtue of capillary action and surface tension, creating a taper seal whereby the outside gap serves as an oil buffer preventing outflow of the lubricating oil.

Grooves (in spiral form, for example) for developing in the lubricating oil pressure directed toward center axis J1 when the rotor part 3 spins are formed in the top endface of the sleeve 22, wherein a thrust dynamic-pressure bearing section is constituted by means of the upper gap. Likewise, helical grooves that from the upper gap continue to the lower gap are furnished in the outer circumferential surface of the shaft 311 that is a constituent of the journal 30, whereby the pressure of the lubricating oil in the lower gap is equalized with the elevated pressure of the lubricating oil in the upper gap, and thus the lower gap functions as a thrust static-pressure bearing.

Meanwhile, formed in the surfaces opposing each other in the lateral gap are grooves (such as herringbone grooves, for example, provided in upper and lower areas, relative to the way in which center axis J1 is oriented, of the outer circumferential surface of the outer tubular member 32) for developing hydrodynamic pressure in the lubricating oil, wherein a radial dynamic-pressure bearing section is constituted by means of the lateral gap.

In the motor 1, with the bearing mechanism being a hydrodynamic pressure bearing, the non-contact supporting of the rotor part 3 via the lubricating oil enables the rotor part 3 to spin with high precision and low noise. In particular, in the bearing mechanism described above, because air does not intervene in the bearing interior, abnormal contact between the journal 30 and the sleeve 22, originating in air bubbles generated within the lubricating oil, lubricating oil leakage due to air in the bearing interior expanding, and similar problems are kept all the more under control.

Thus the rotor part 3 is rotatably supported on the stationary section 2 by means of a bearing mechanism employing hydrodynamic pressure from a lubricating oil, and controlled supplying of current to the stator 24 drives, by means of magnetic action between the field magnet 34 and the stator 24, the rotor part 3 rotationally with respect to the stationary section 2, with center axis J1 of the journal 30 (which is also the center axis of the sleeve 22) as the rotational center.

Figure 3:
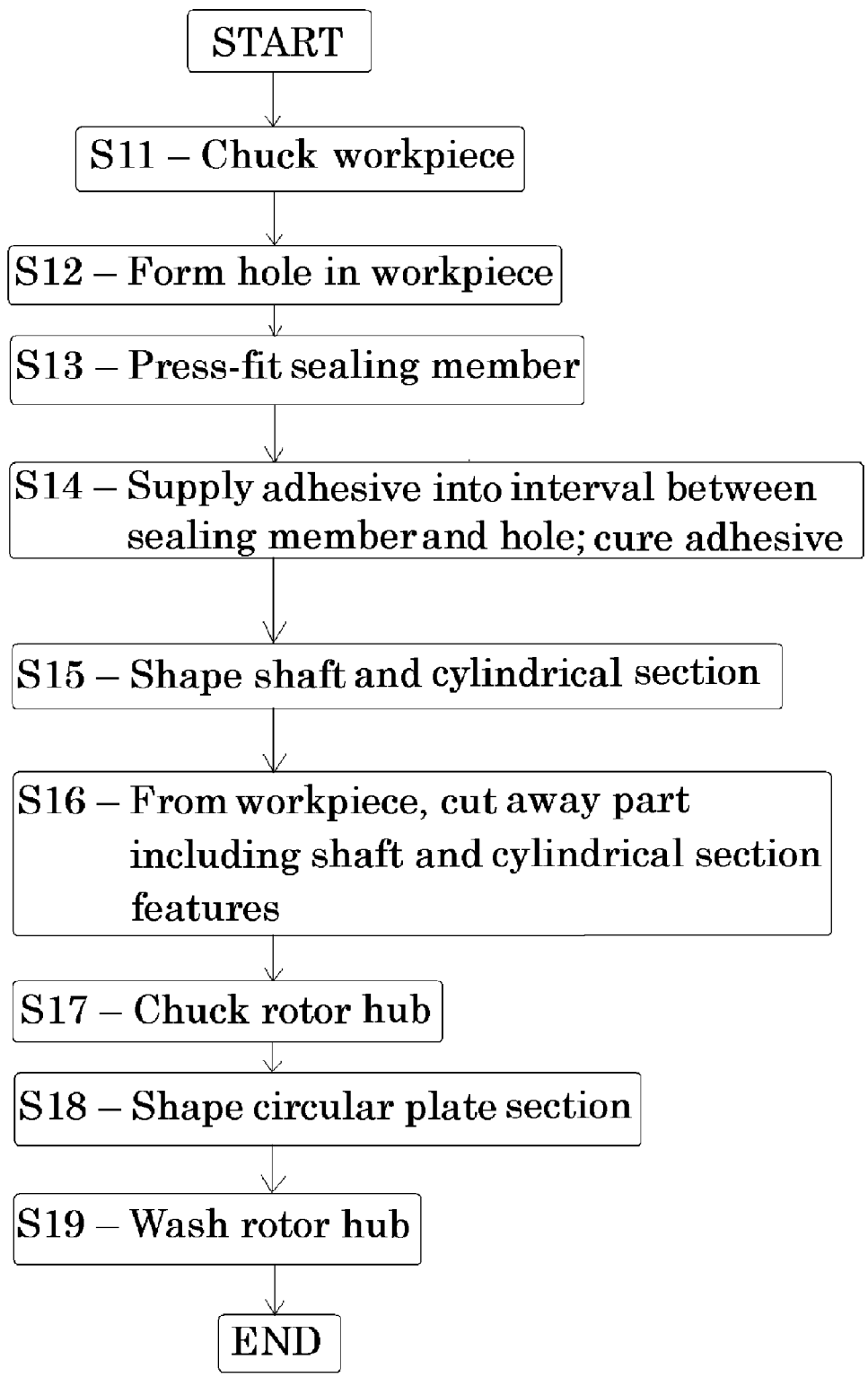
FIG. 3 is a chart setting forth operational flow in the manufacture of a rotor hub involving a first embodiment of the present invention.
Figure 4B:
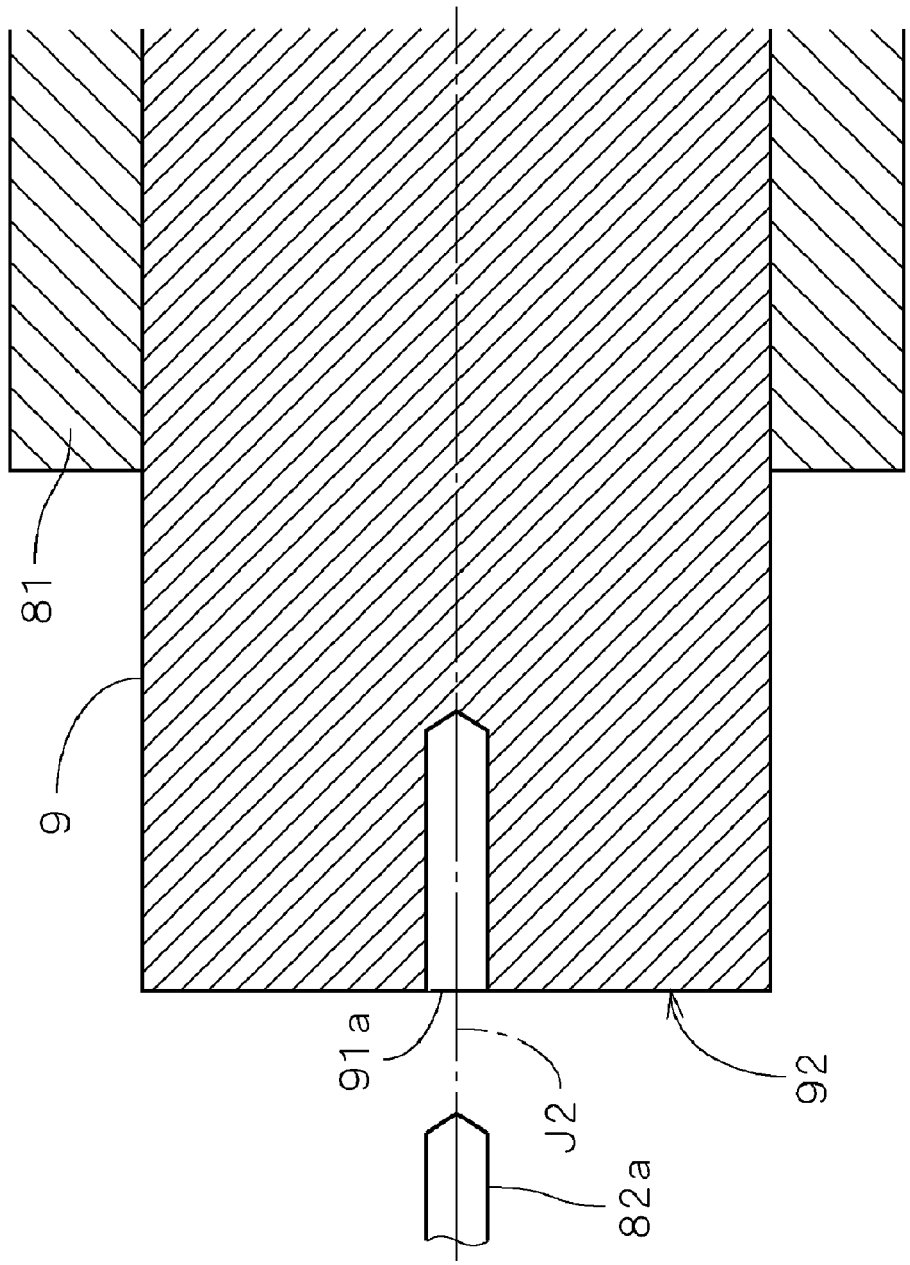

Next, a method of manufacturing the rotor hub 31 will be explained. Reference is made to FIG. 3, which is a chart setting forth operational flow in the manufacture of the rotor hub 31, and to FIGS. 4A through 4H, which are section views representing successive stages in the course of manufacturing the rotor hub 31. When a rotor hub 31 is to be manufactured, a round rod-shaped workpiece 9, which is the machining stock, is prepared, and as represented in FIG. 4A, the workpiece 9 is held by means of a chuck 81, which is the retaining device in a numerical-control (NC) lathe (Step S11). The chuck 81 rotates, on predetermined center axis J2 as the rotational center, relative to a tool (i.e., an implement such as a twist drill or lathe bit) while retaining the workpiece 9 along its outer circumferential side with its center axis made closely coincident with center axis J2 of the chuck 81.

Figure 4C:
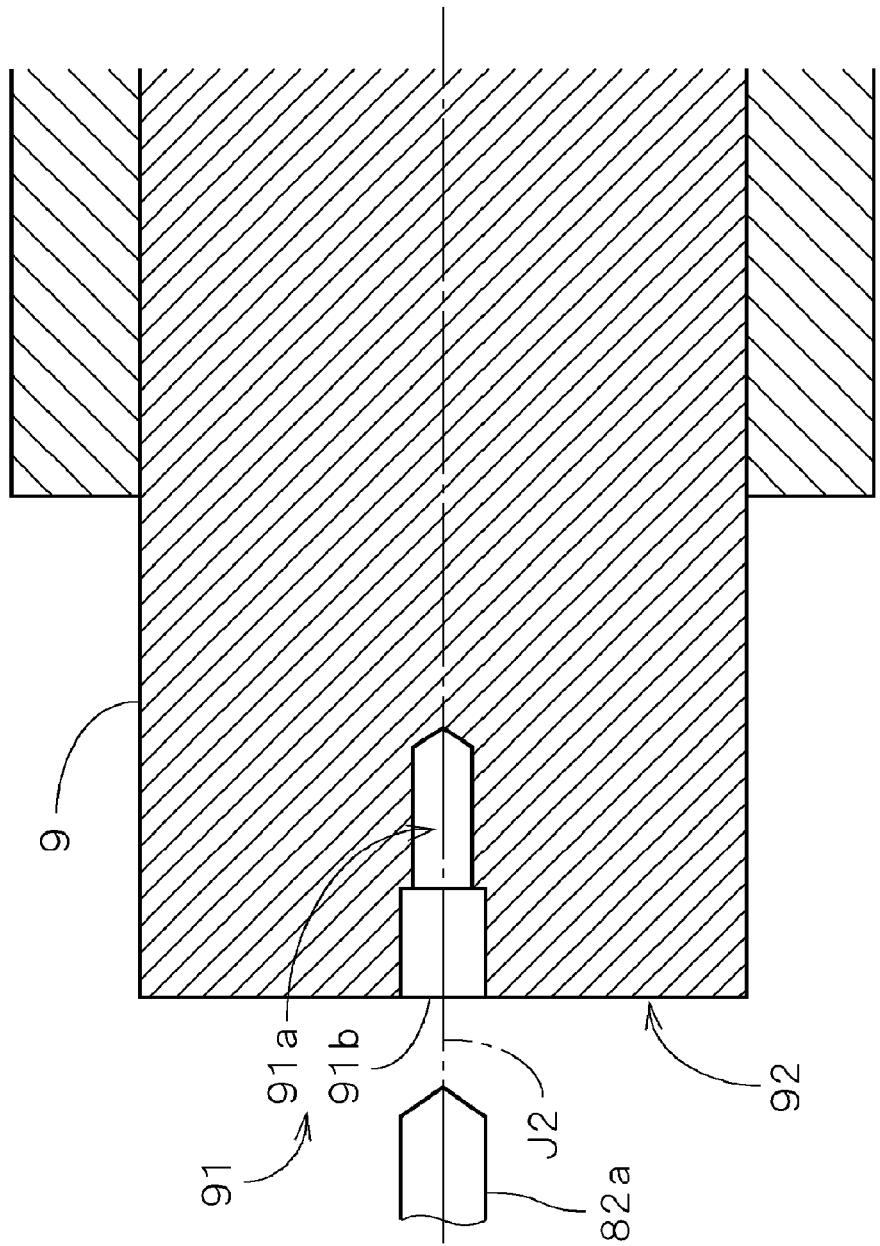
Figure 4D:
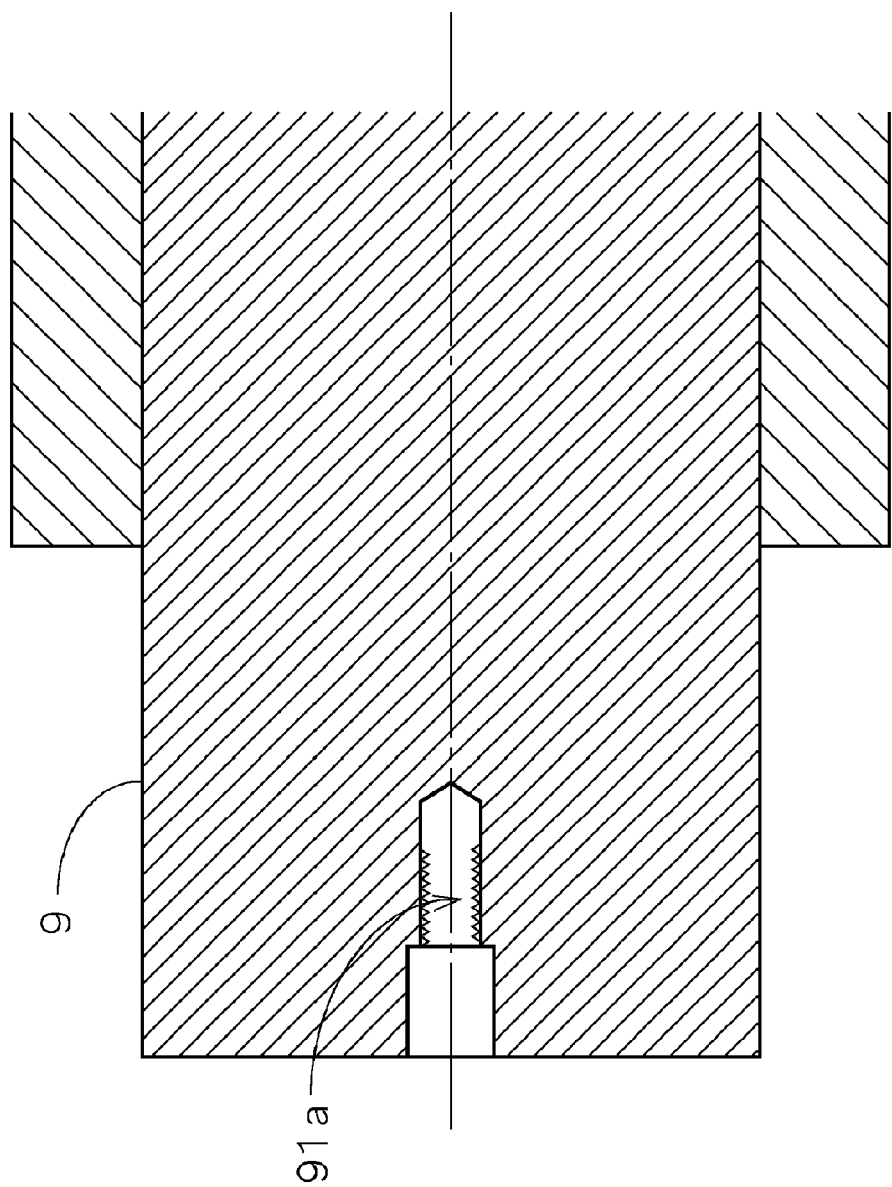

Then, as indicated in FIG. 4B, into the workpiece 9 rotating together with the chuck 81 a hole 91a centering on center axis J2 is formed by means of a drill 82a, in one side (the left side in FIG. 4A) with respect to the orientation along center axis J2. Hereinafter, the endface 92 on the side of the workpiece 9 in which the hole 91a is formed will be termed the "machining start face 92." Subsequently, as indicated in FIG. 4C, by means of a drill 82b whose diameter is greater than that of drill 82a (cf. FIG. 4B), a hole 91b centering on center axis J2 is formed, fashioned so as to overlie hole 91a, into the machining start face 92 side of the workpiece 9 (Step S12). Hereinafter, holes 91a and 91b, formed by the two different drills 82a and 82b, will together be referred to as "hole 91." Hole 91, centering on center axis J2, ultimately becomes the through-hole 3110 in the rotor hub 31, illustrated in FIG. 2. With hole 91 having been formed, internal threads as indicated in FIG. 4D are formed in hole 91a.

Figure 4E:
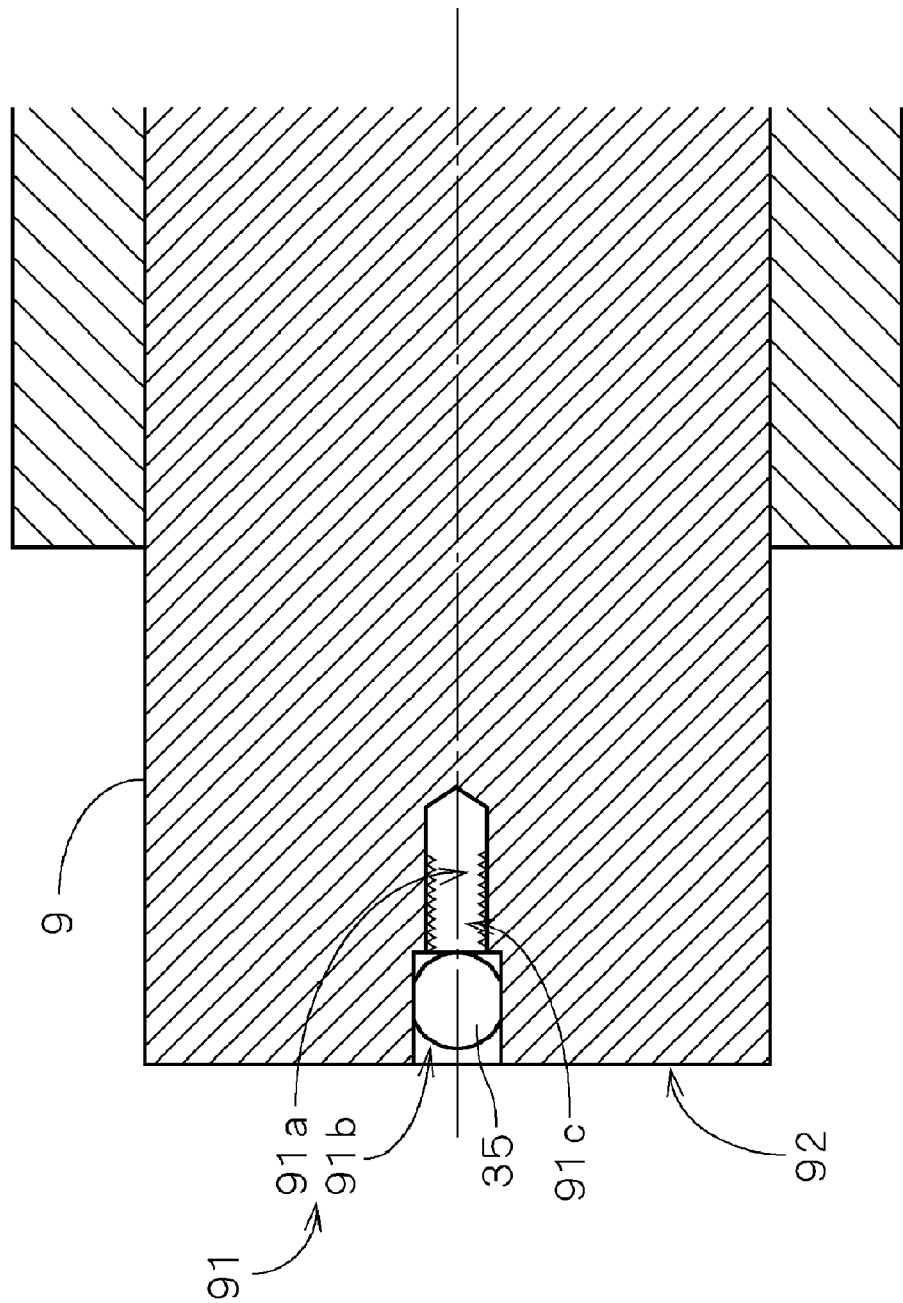

In the next stage, as indicated in FIG. 4E, the sealing member 35, made of metal and in the form of cross-sectionally round globe having a diameter greater than that of hole 91b, is press-fitted into hole 91b (i.e., inserted while force is applied to it, or is pressed in while force is applied to it) through the machining start face 92 side of the workpiece 9. In the workpiece 9, hole 91 is sealed by the sealing member 35 having been inserted into hole 91, with an internal space 91c isolated from the exterior being formed on the side of the sealing member 35 opposite the machining start face 92 (Step S13). The internal space 91c is constituted by hole 91a and a portion of hole 91b. Since the sealing member 35 is deformed by being press-fit into hole 91, it is adhered fast to the inner circumferential surface of the hole 91.

Figure 4F:
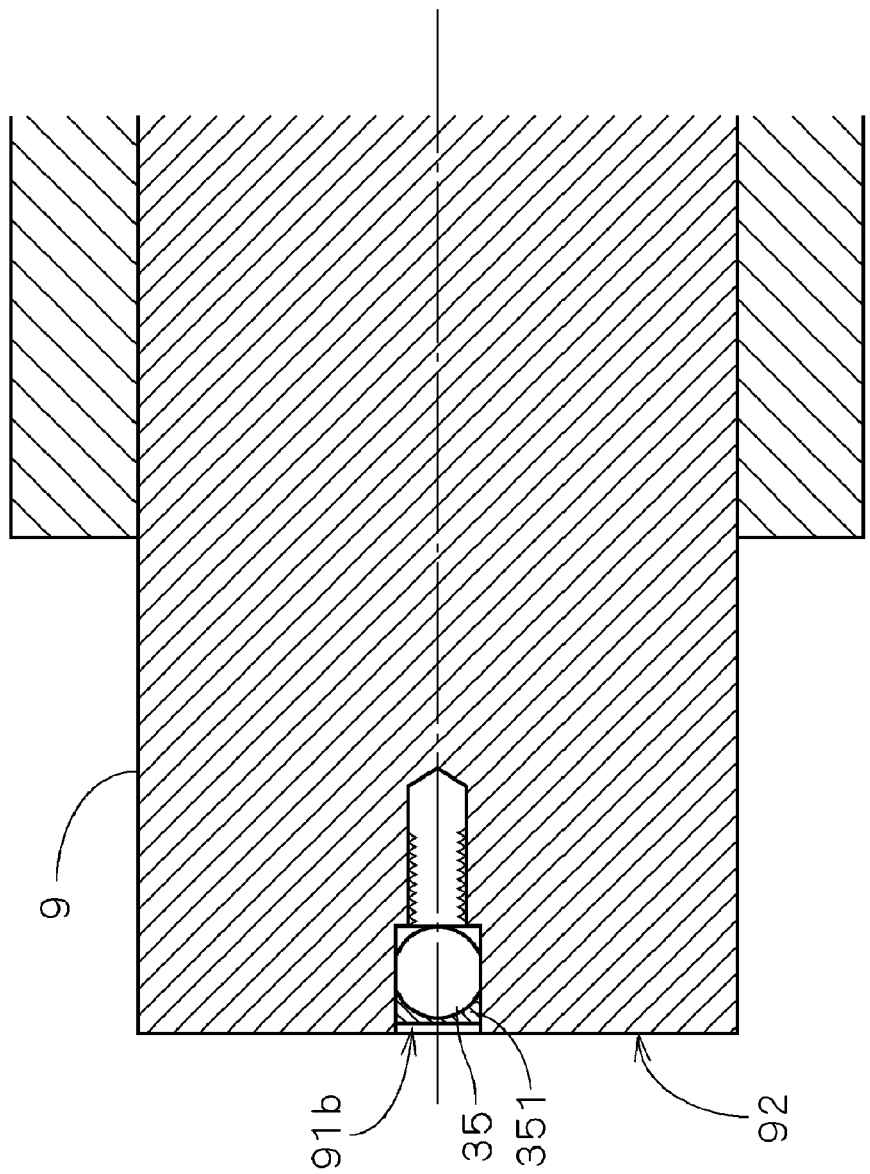

With the internal space 91c having been formed, the workpiece 9 (especially in the proximity of the sealing member 35) is according to requirements washed and then dried. Then, as indicated in FIG. 4F, an adhesive 351 is supplied through the machining start face 92 side of the workpiece 9 into the area on the left side of the sealing member 35 (along the mouth of hole 91) that includes the interval between the sealing member 35 and hole 91b (in particular, alongside the mouth of hole 91, about the periphery of the sealing member 35 in the vicinity of the region where it adheres with the inner circumferential surface of hole 91b), and is cured within hole 91b (Step S14).

Figure 4G:
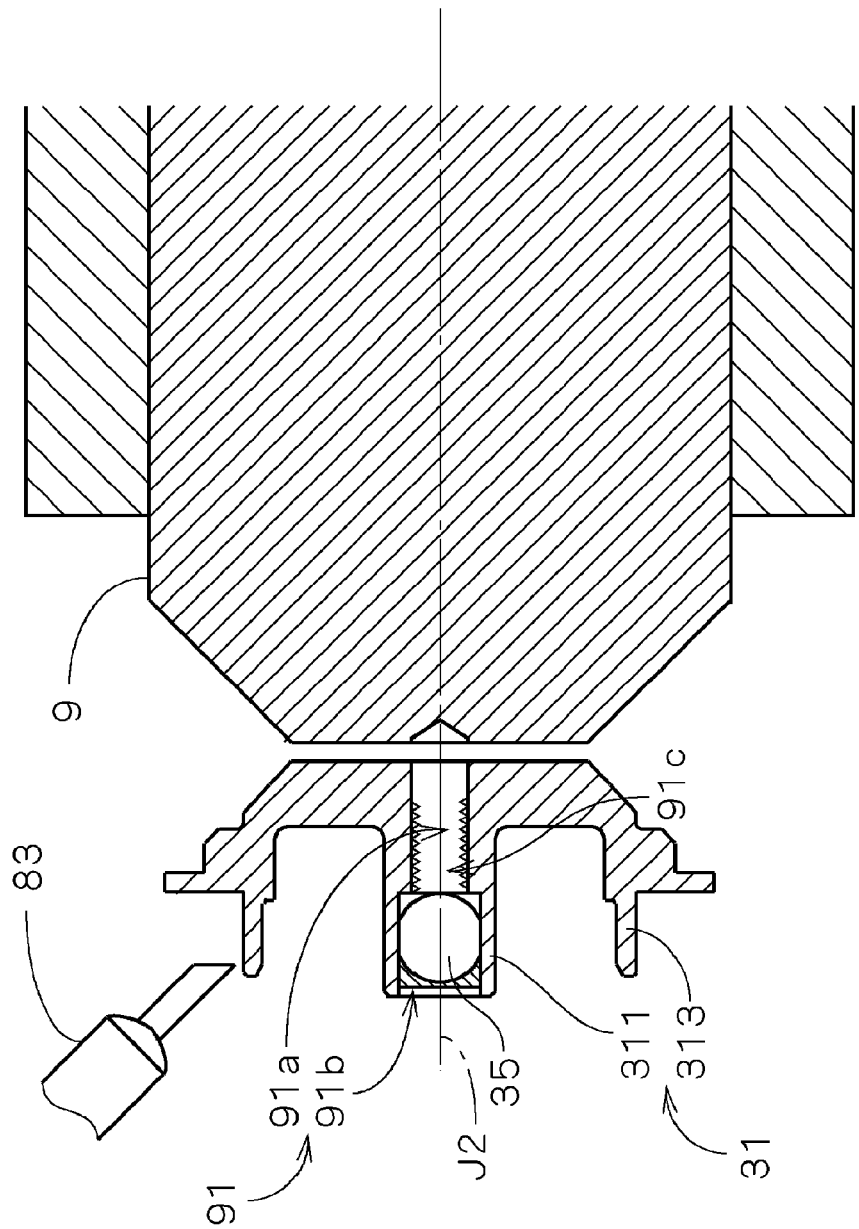

With the adhesive 351 having cured, as represented in FIG. 4G, by cutting operations into the workpiece 9 around the periphery of hole 91 using a lathe bit 83, a feature that projects toward the machining start face 92 (cf. FIG. 4A) and is centered on center axis J2 is shaped. This "feature" as it has just been termed is the part that forms the shaft 311 illustrated in FIG. 2, and thus will be denoted "shaft 311" in the following. Likewise, a roughly cylindrical feature (i.e., the workpiece part forming the cylindrical part 313—thus referred to as "cylindrical part 313" below) that juts toward the machining start face 92 is shaped by cutting operations using the lathe bit 83 on the workpiece 9 in the proximity of its rim portion (Step S15). It will be appreciated that although a state in which the part that includes the shaft 311 and cylindrical part 313 features has been cut away from the workpiece 9 is portrayed in FIG. 4G, at the time the shaft 311 and cylindrical part 313 are shaped as described above, this part still has not been separated from the workpiece 9. It will also be appreciated that the type of lathe bit 83 employed to shape the shaft 311 and cylindrical part 313 may be changed to suit.

With the shaft 311 and cylindrical part 313 having been shaped, in the proximity of the end portion of the internal space 91c on the side opposite the machining start face 92 (cf. FIG. 4A), the part that includes the shaft 311 and cylindrical part 313 features is cut away from the workpiece 9 through a sectioning plane that is perpendicular to center axis J2 and that includes the internal space 91c (i.e., columnar hole 91a). By this operation, a part including the shaft 311 and cylindrical part 313 features is obtained (Step S16) as the rotor hub 31, which is a shaft unit under the present embodiment. In the rotor hub 31, the internal space 91c where it opens onto the side opposite the sealing member 35 constitutes the upper space 3111 (cf. FIG. 2). Likewise, the space flanking the sealing member 35 on the side opposite the internal space 91c constitutes the lower space 3112 (cf. FIG. 2).

Figure 4H:
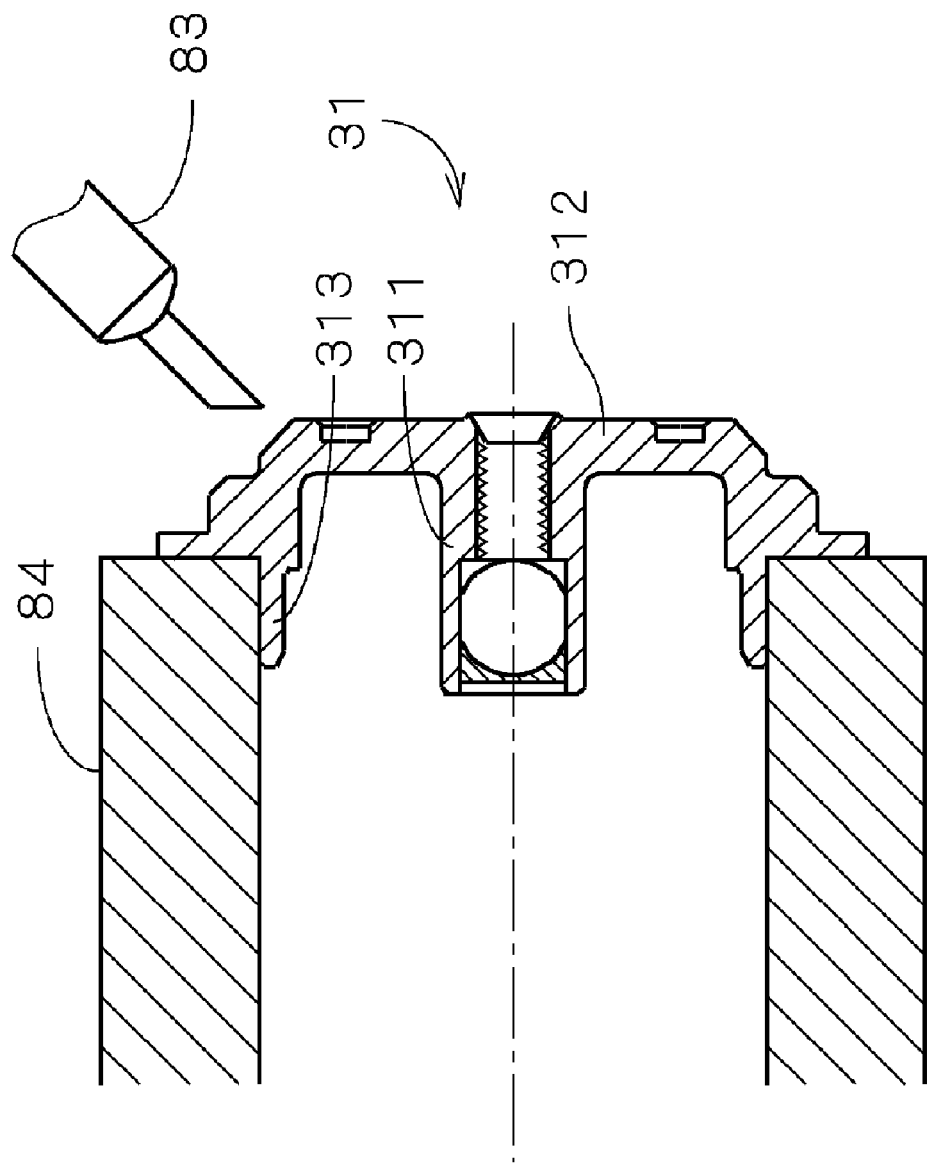

The rotor hub 31 having been cut away from the workpiece 9 is retained (Step S17), as illustrated in FIG. 4H, along the outer circumferential side of the cylindrical part 313 by means of another chuck 84, situated on the rotor-hub side from which the shaft 311 projects. The surface of the rotor hub 31 on the side opposite the side from which the shaft 311 projects is then cut using the bit 83 or cutting tool to shape the circular plate part 312 (Step S18). After that, the rotor hub 31 is given another wash using a washing or other cleaning device, which completes the manufacture of the rotor hub 31.

COMPARATIVE EXAMPLE

Figure 5:
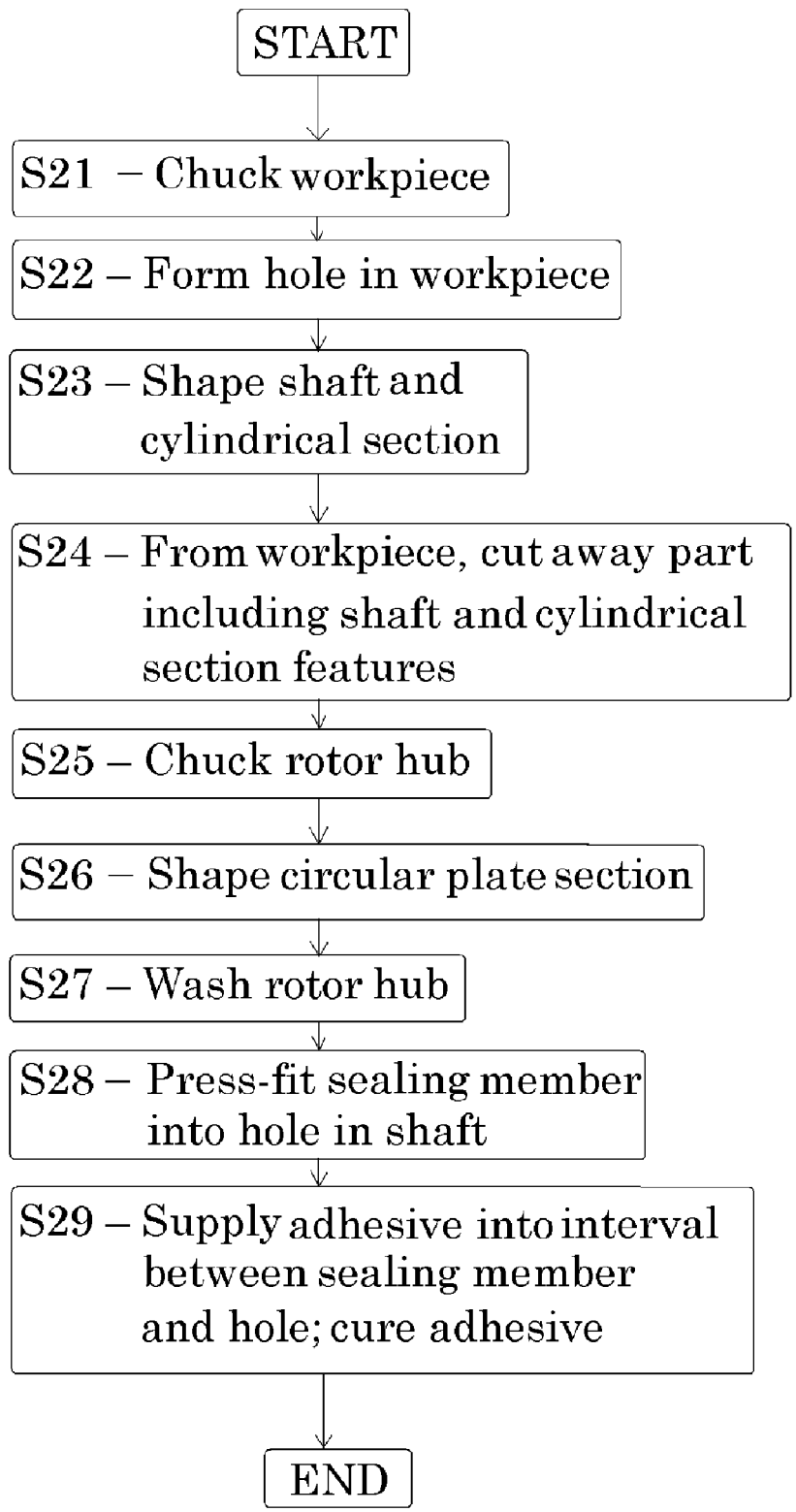
FIG. 5 is a chart setting forth operational flow in the manufacture of a rotor hub according to a manufacturing method in a comparative example.

As an example for comparison with the above-described method of manufacturing the rotor hub 31, a manufacturing method in which the sealing member is inserted after forming the shaft will be explained. Reference is made to FIG. 5, which is a chart setting forth operational flow in the manufacture of a rotor hub 731 in this comparative example, and to FIGS. 6A through 6C, which are sectional views representing successive stages in the course of manufacturing the rotor hub 731. Furthermore, for steps that are the same as those of the first embodiment, the reference marks are omitted and reference is made to FIGS. 4A through 4D as appropriate.

At first, a round rod-shaped workpiece 79 is retained along its outer circumferential side by means of the chuck on an NC lathe (Step S21, cf. FIG. 4A), and a hole 791 centering on the chuck center axis J2 is formed in the workpiece (Step S22, cf. FIGS. 4B and 4C). Internal threads are then formed along a portion of the hole 791 (cf. FIG. 4D).

Figure 6A:
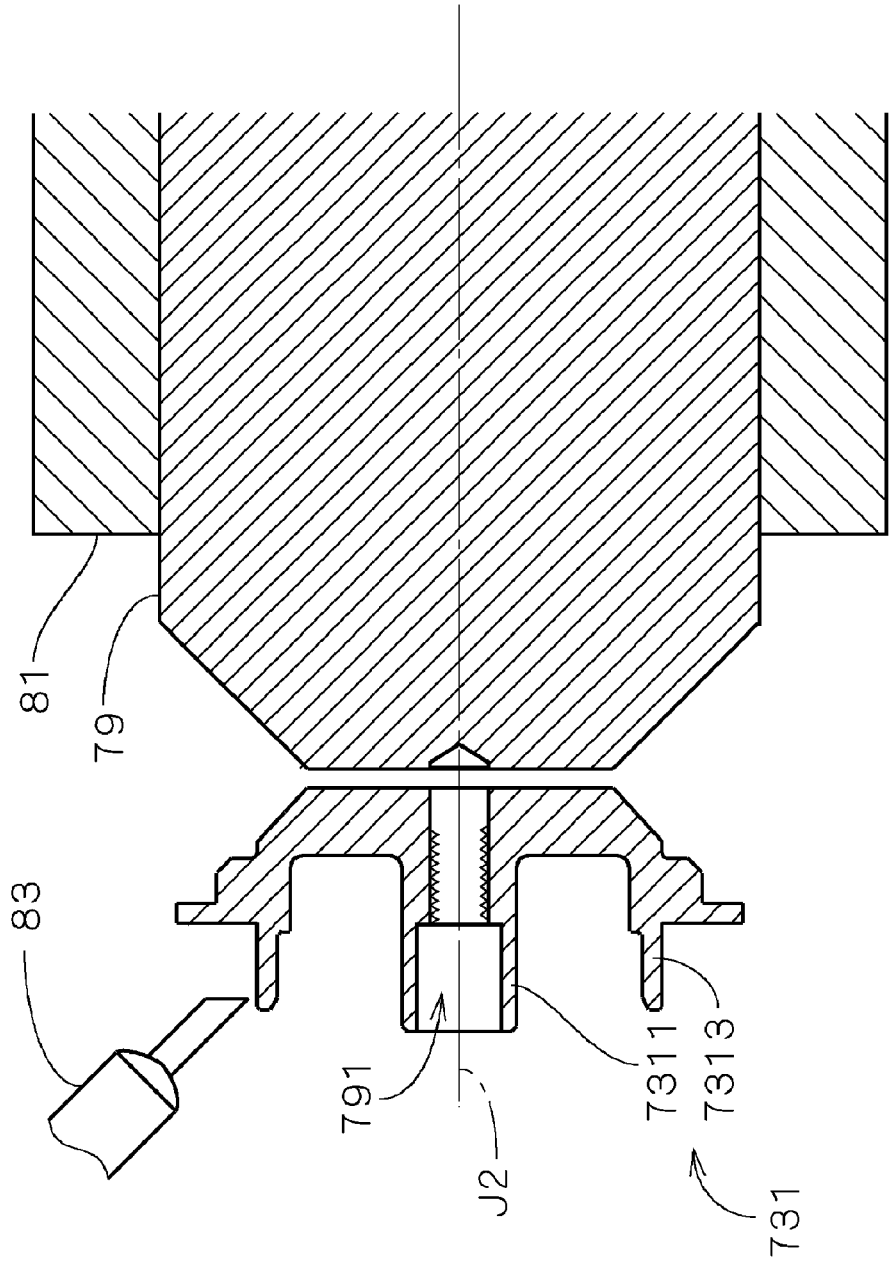
FIGS. 6A through 6C are section views representing successive stages in the course of manufacturing the comparative-example rotor hub.

Subsequently, as indicated in FIG. 6A, the lathe bit 83 is used to cut into the workpiece 79, retained by the chuck 81, around the periphery of the hole 791, forming a projecting shaft 7311 with center axis J2 of the chuck 81 as its center. Meanwhile, a roughly round tubular cylindrical part 7313 that projects in the same direction as the shaft 7311 is shaped by cutting operations using the lathe bit 83 on the workpiece 79 in the proximity of its rim portion (Step S23).

With the shaft 7311 and cylindrical part 7313 having been shaped, in the proximity of the end portion of the workpiece 791 on the side opposite its open side, the part that includes the shaft 7311 and cylindrical part 7313 features is cut away from the workpiece 79 through a sectioning plane that is perpendicular to center axis J2 and that includes the hole 791a. By this operation, a part including the shaft 7311 and cylindrical part 7313 features is obtained (Step S24) as the rotor hub 731, which is a shaft unit according to the present example. In the rotor hub 731, the hole 791 is a through-hole penetrating the rotor hub 731.

Figure 6B:
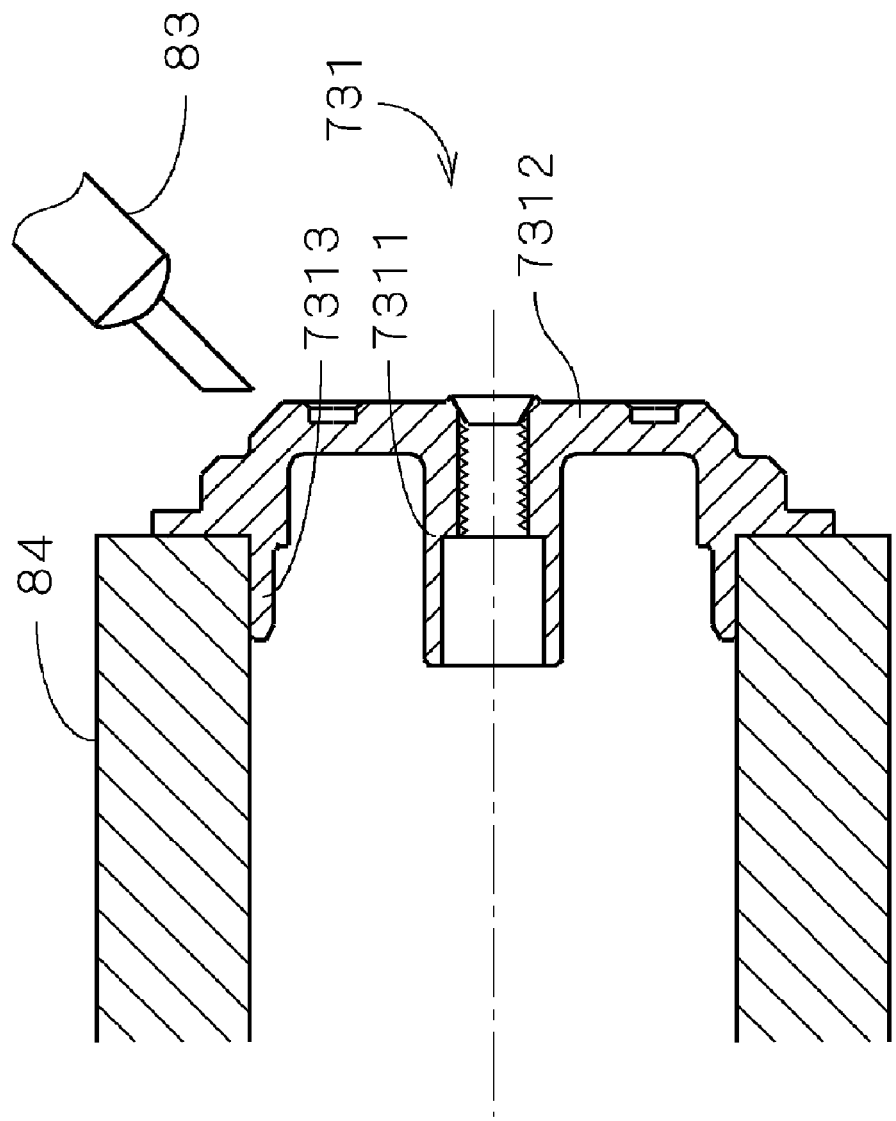
Figure 6C:
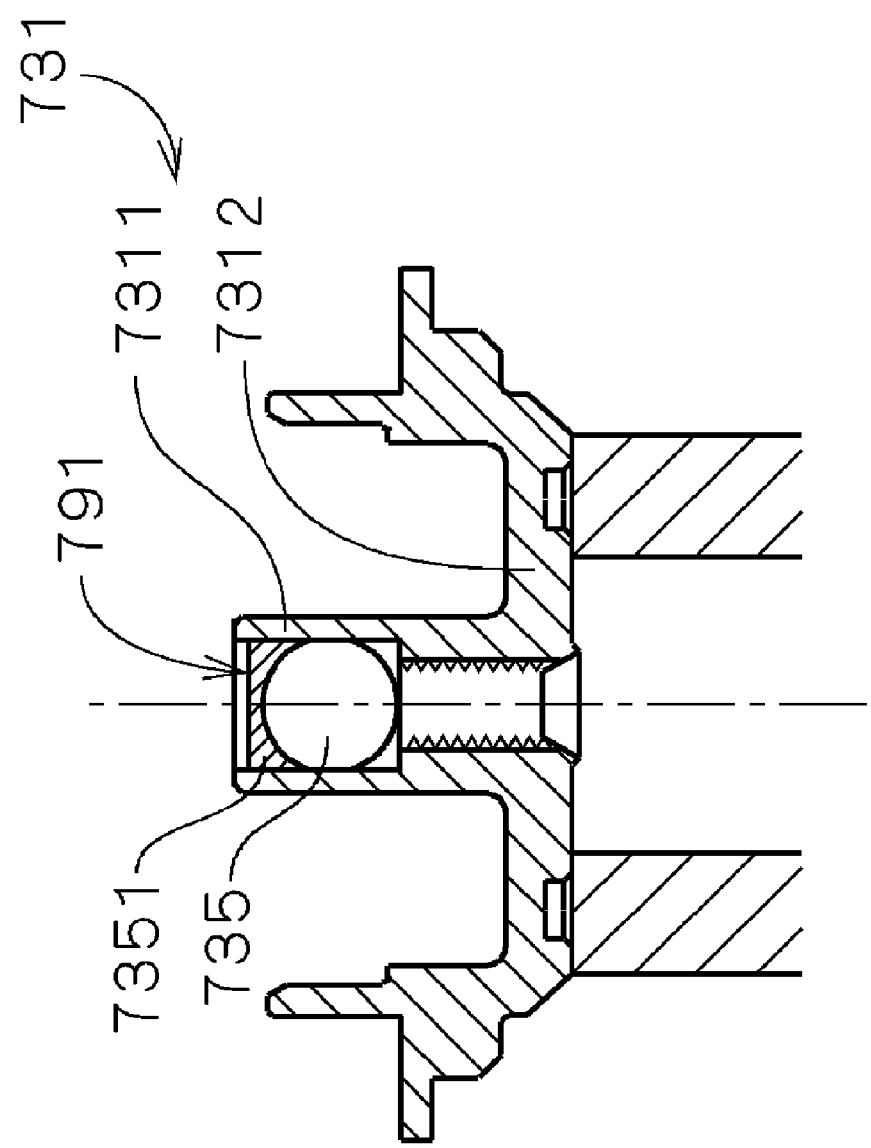

The rotor hub 731 having been cut away is retained (Step S25), as illustrated in FIG. 6B, along the outer circumferential side of the cylindrical part 7313 by means of the chuck 84, situated on the rotor-hub side from which the shaft 7311 projects. The surface of the rotor hub 731 on the side opposite the side from which the shaft 7311 projects is then cut using the bit 83 or other cutting tool to shape a rotor-hub circular plate part 7312 (Step S26). Subsequently, after the rotor hub 731 has been washed, it is mounted as shown in FIG. 6C with the circular plate part 7312 made the bottom side, and into the hole 791 formed in the shaft 7311, through the mouth on the side opposite the circular plate part 7312 side, a sealing member 735 having a diameter greater than that of the mouth is press-fit (Steps S27, S28). The sealing member 735 is globular and fashioned from metal. Thereafter, by supplying an adhesive 7351 into interval between the sealing member 735 and the hole 791, through the mouth on the side of the hole 791 opposite its circular plate part 7312 side, and curing the adhesive, the manufacturing procedure is completed (Step S29).

In the manufacturing method of the comparative example as described in the foregoing, the fact that the sealing member 735 is press-fitted after formation of the shaft 7311 runs the risk that the shaft 7311 will warp, or like occurrences will arise, on account of the press-fitting of the sealing member 735. Yet attempting to keep the shaft 7311 from warping would require employing a sealing member 735 of comparatively small diameter, creating the likelihood that the sealing of the hole 791 would be insufficient.

In contrast, in the rotor hub 31 manufacturing method involving the first embodiment of the present invention, the sealing member 35 is press-fit into the hole 91 in the workpiece 9 in a state in which the bulk surrounding the hole 91, being massive (relative to the shaft 311), is highly strong, and thereafter the periphery about the hole 91 is cut to shape the shaft 311. The method therefore makes it possible to prevent impact on the conformation of the shaft 311 due to the insertion of the sealing member 35 (for example, impact such as a slight distorting of the shaft 311 that bulges the surface). An additional benefit is that the shaft 311 can be rendered into a desired conformation even as the spaces on either side of the sealing member 35 in the through-hole 3110 within the shaft 311 (i.e., the upper space 3111 and lower space 3112 indicated in FIG. 2) are securely isolated from each other.

The conformational precision of the shaft 311 can be made high even in a manufacturing method that involves press-fitting the sealing member 35 into the shaft 311. In addition, the fact that the sealing member 35 is made of metal enables securely isolating the spaces on either side of the sealing member 35 from each other. Accordingly, utilizing a thus-fashioned rotor hub 31 in the motor 1 more positively prevents lubricating oil and other matter in the interior of the motor 1 from invading the space around the recording disks 62, which must be kept clean.

In the manufacturing method set forth in FIG. 3, the step (Step S14) in which the adhesive 351 is supplied and cured in between the sealing member 35 and hole 91b is in between the step (Step S13) in which the internal space 91c is formed, and the step (Step S15) in which the shaft 311 is formed. This enables the spaces 91a and 91b on either side of the sealing member 35, positively isolated from each other by the metal sealing member 35, to be kept more securely segregated. This also makes it possible to prevent impact on the conformation of the shaft 311 due to shrinking or other factors when the adhesive 351 cures, which could occur in a situation assuming that the adhesive 351 is supplied and cured in an operation parallel to the formation of the shaft 311, or in a situation as in the manufacturing method of the comparative example, in which the adhesive 7351 is supplied and cured after formation of the shaft 7311.

Of further note is that in the first embodiment as described above, being able to securely isolate the spaces on either side of the sealing member 35 from each other means that the through-hole 3110 in the rotor hub 31 can be securely sealed. This makes it possible, in a motor 1 furnished with a hydrodynamic pressure bearing in which the lower-end mouth of the through-hole 3110 is situated within the lubricating oil, to reliably prevent the lubricating oil from traveling along the inner circumferential surface of the through-hole 3110 and invading the recording-disk area. Consequently, a manufacturing method involving the first embodiment of the present invention should be especially suited to the manufacture of rotor hubs 31 for motors 1 furnished with a hydrodynamic pressure bearing.

Furthermore, in a manufacturing method involving the first embodiment, forming the rotor hub 31 with the shaft 311, the circular plate part 312, and the cylindrical part 313 as single component makes it possible to realize downsizing (in particular, flattening) of the rotor hub 31 and the motor 1, and improvement in the precision with which the rotor hub 31 is machined. And the rotor hub 31 can be manufactured through only two different chucking operations (that is, the number of times the material that will become the rotor hub 31 is chucked is only twice—by chuck 81 and chuck 84). This consequently abates rotor hub 31 precisional decline otherwise due to the added number of times that the rotor-hub forming material would be chucked, and lessens cost increases, etc. owing to chucking operations.

Second Embodiment

Figure 7:
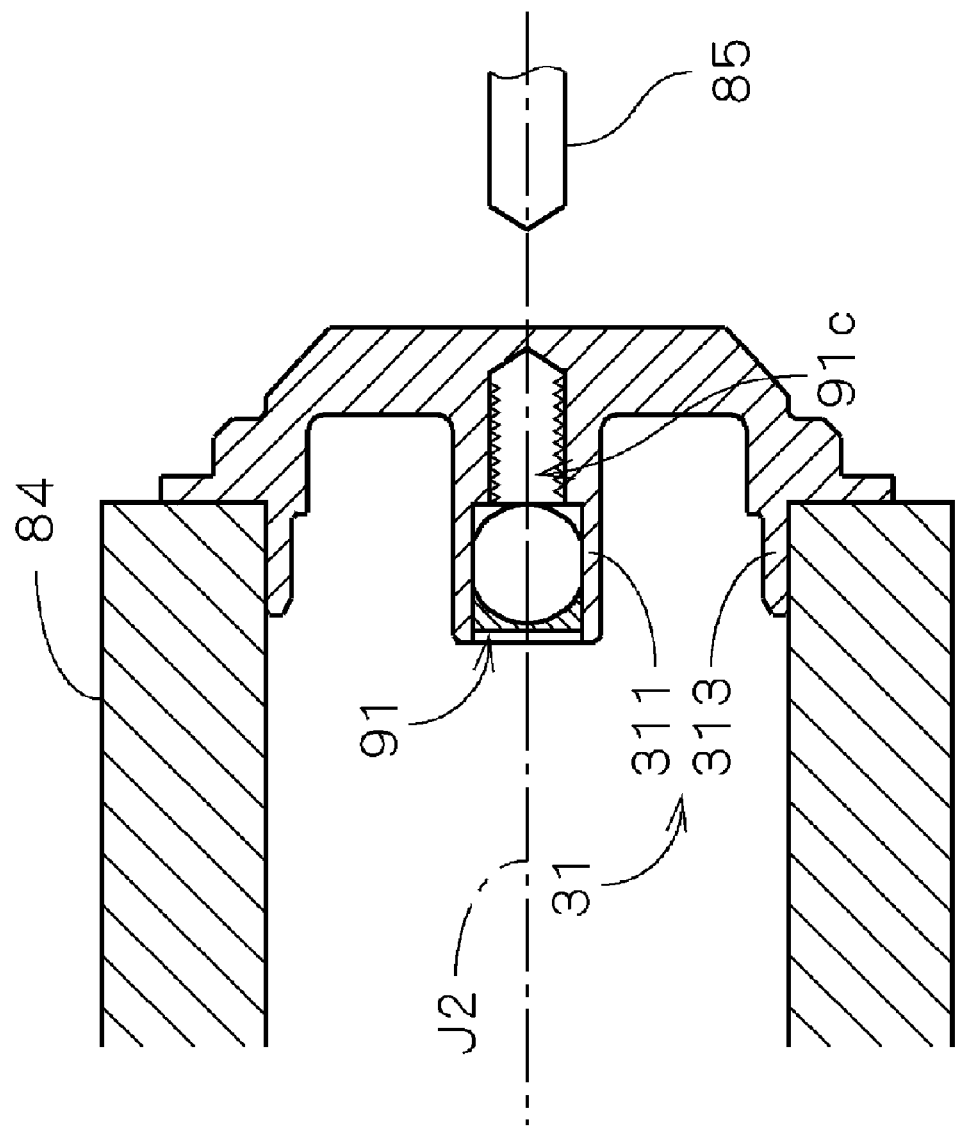
FIG. 7 is a section view illustrating a stage in the course of manufacturing a rotor hub involving a second embodiment of the present invention.

Reference is made to FIG. 7, a sectional view representing a stage in the course of fashioning a rotor hub 31 manufactured according to a second manufacturing method of the present invention. In the second manufacturing method, likewise as in the foregoing first embodiment, a hole 91 is formed in a workpiece 9, the hole 91 is sealed by means of the sealing member 35 and the adhesive 351, forming internal space 91c, after which the shaft 311 and cylindrical part 313 are shaped.

Then, as indicated in FIG. 7, the part of the workpiece 9 that includes the shaft 311 and cylindrical part 313 features is cut away from the workpiece 9 through a position that is more rightward than the internal space 91c, and that does not include the internal space 91c. At this point, the internal space 91c forms a saclike space that is not linked with exterior space.

The workpiece part having been cut away is then retained along the outer circumferential side of the cylindrical part 313 by means of the chuck 84, and a hole heading toward the internal space 91c is bored with a drill 85 through the side of the part along the internal space 91c opposite the machining start face 92. Thus, by forming through the internal space 91c an opening that opens on the opposite side from the sealing member 35, i.e., an opening that opens on the side of the part opposite the side of the sealing member 35 where the shaft 311 juts out, a rotor hub 31 that is a shaft unit under this embodiment is formed. After that, similarly as in the first embodiment, the surface on the side of the rotor hub 31 opposite the side from which the shaft 311 projects undergoes a cutting operation that shapes the circular plate part, and the rotor hub 31 is then washed, whereby its manufacture is completed.

Third Embodiment

Figure 8:
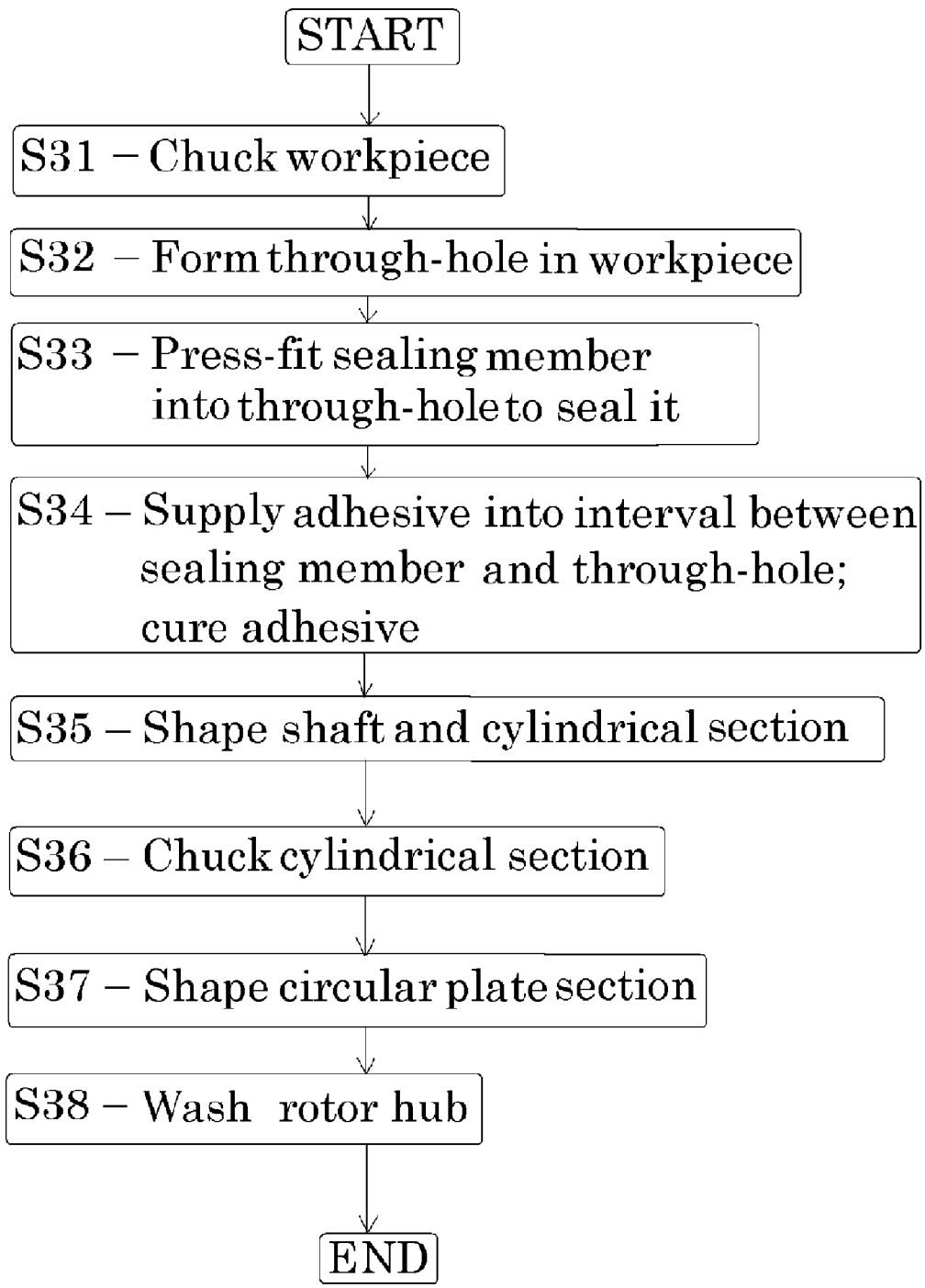
FIG. 8 a chart setting forth operational flow in the manufacture of a rotor hub involving a third embodiment of the present invention.

Next, a method of manufacturing a rotor hub as a spindle-motor shaft unit involving a third embodiment of the present invention will be explained. The rotor hub manufactured in the third embodiment has the same structure as that of rotor hub 31 illustrated in FIG. 2, and thus in the following explanation the same reference marks are appended to the constituents. Reference is made to FIG. 8, which is a chart setting forth operational flow in the manufacture of the rotor hub, and to FIGS. 9A through 9E, which are sectional views representing successive stages in the course of manufacturing the rotor hub 31.

Figure 9A:
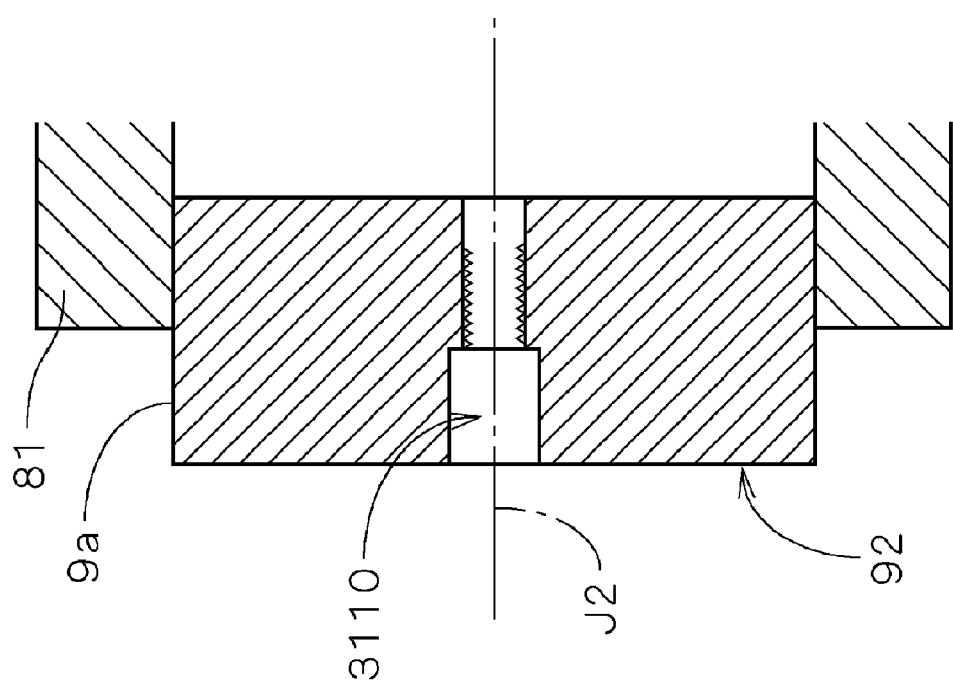
FIGS. 9A through 9E are section views representing successive stages in the course of manufacturing the third-embodiment rotor hub.

At first, as indicated in FIG. 9A, an approximately disk-shaped workpiece 9a, which is the machining stock, is prepared and is retained by means of the chuck 81 on the NC lathe (Step S31). In the manufacturing method of the third embodiment, the thickness of the workpiece 9a in the orientation along its center axis is about the same as the thickness of the rotor hub 31 that is being manufactured, and thus a single rotor hub 31 is shaped from a single workpiece 9a. The chuck 81 rotates, on predetermined center axis J2 as the rotational center, relative to the tool while retaining the workpiece 9a along its outer circumferential side with its center axis made closely coincident with center axis J2 of the chuck 81.

With the workpiece 9a having been chucked, after a suitable endface shaping operation has been carried out, a through-hole centering on center axis J2 and penetrating the workpiece 9a is formed through one side (i.e., the machining start face 92 side) with respect to the orientation along center axis J2 (Step S32). Here, this just-described through-hole is the hole that forms the through-hole 3110 in the shaft 311 illustrated in FIG. 2 once the manufacture of the rotor hub 31 has been completed, and thus will be denoted "through-hole 3110" below. Internal threads are then formed in a region of the through-hole 3110 on the side opposite the machining start face 92.

Figure 9B:
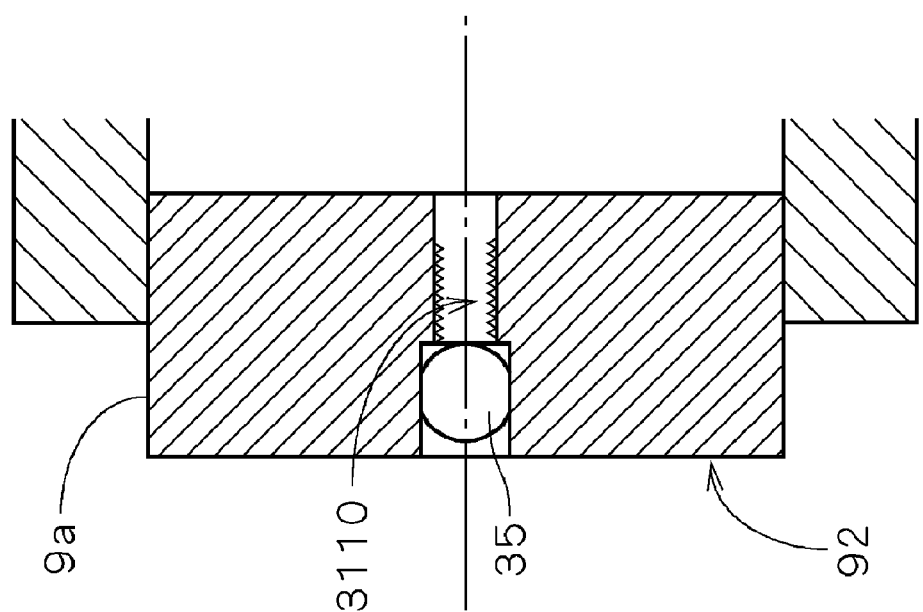

Subsequently, as indicated in FIG. 9B, a sealing member 35, made of metal and in the form of a globe having a diameter greater than that of the region of the through-hole 3110 on its machining start face 92 side, is press-fitted (i.e., inserted while force is applied to it) into the through-hole 3110 through machining start face 92 side (Step S33). By being press-fit into the through-hole 3110, the sealing member 35 deforms and thereby adheres to the inner circumferential surface of the through-hole 3110.

Figure 9C:
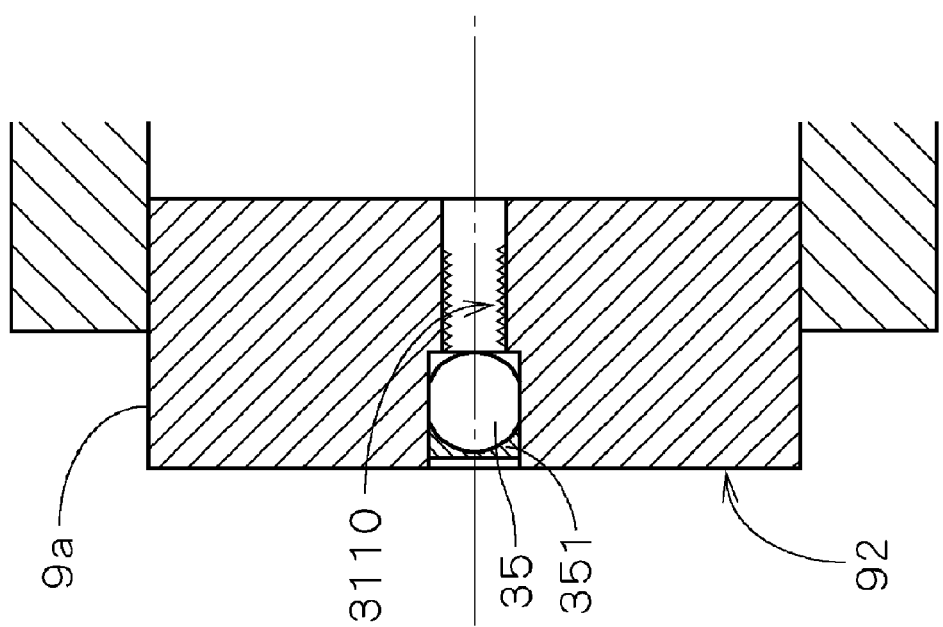

With the through-hole 3110 having been sealed, the workpiece 9a is according to requirements washed and then dried. Next, as indicated in FIG. 9C, an adhesive 351 is supplied through the machining start face 92 side of the workpiece 9a into the area on the left side of the sealing member 35 that includes the interval between the sealing member 35 and the through-hole 3110, and the adhesive 351 is cured within the through-hole 3110 (Step S34).

Figure 9D:
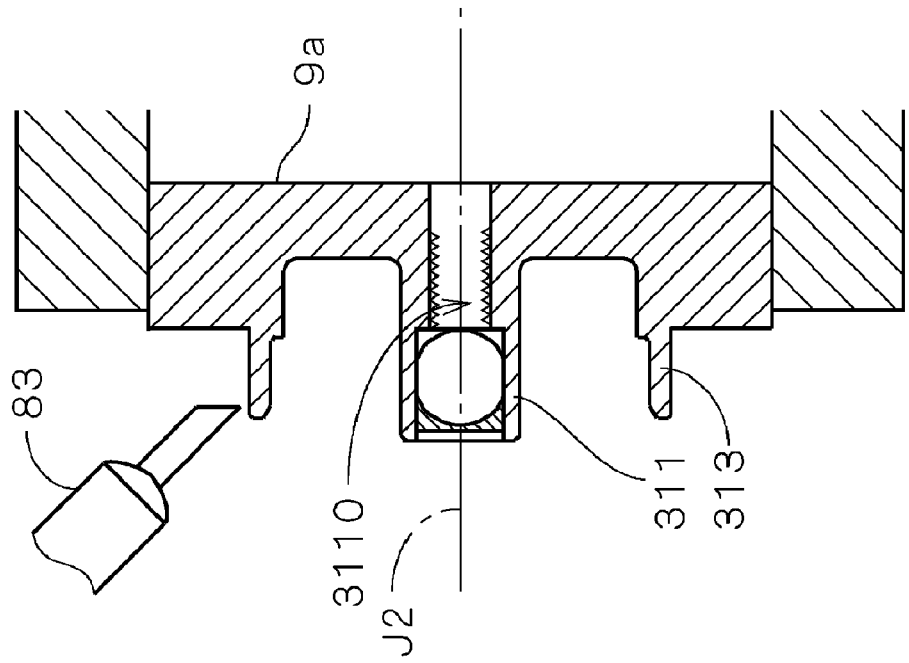

With the adhesive 351 having cured, as represented in FIG. 9D, cutting operations into the workpiece 9a around the periphery of the through-hole 3110 are performed. Thus, the shaft 311 centered on center axis J2 and projecting unilaterally (in the present embodiment, toward the machining start face 92 indicated in FIG. 9A) in the orientation along center axis J2 is shaped. Meanwhile, a roughly round tubular cylindrical part 313 that projects toward the machining start face 92 is shaped on the workpiece 9a, in the proximity of the rim portion thereof (Step S35).

Figure 9E:
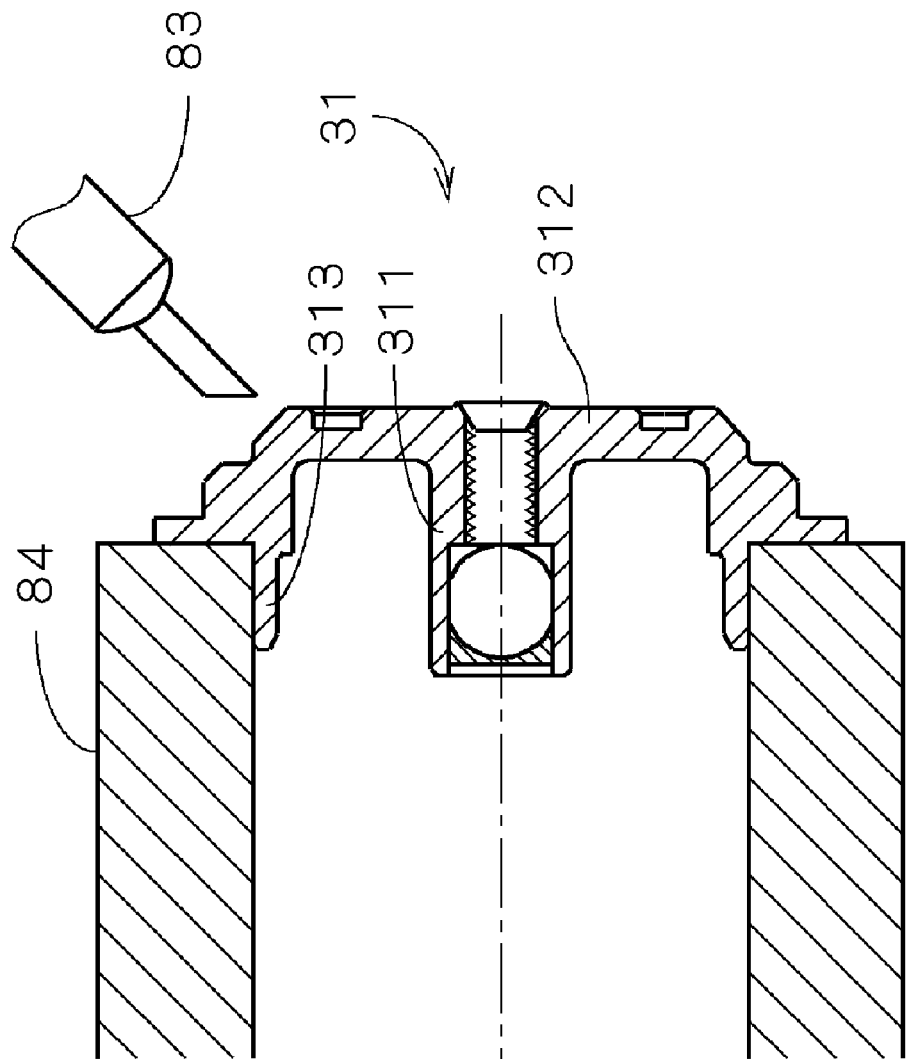

Next, as illustrated in FIG. 9E, the cylindrical part 313 is retained along its outer circumferential side by means of the other chuck 84, situated on the workpiece side from which the shaft 311 projects (Step S36). The surface of the workpiece 9a on the side opposite the side from which the shaft 311 projects is then cut using the bit 83 to shape a rotor-hub circular plate part 312 (Step S37). Through the Step S37 operations, a rotor hub 312 that is a shaft unit according to the present embodiment is formed. Thereafter, the rotor hub 31 is then washed, which completes the manufacture of the rotor hub 31 (Step S38).

As described in the foregoing, in the rotor hub 31 manufacturing method involving the third embodiment, the sealing member 35 is press-fit into the through-hole 3110 in the workpiece 9a in a state in which the bulk surrounding the through-hole 3110, being massive relative to the shaft 311, is highly strong. After that, the periphery about the through-hole 3110 is cut to shape the shaft 311. As is the case with the first embodiment, the method in this embodiment therefore makes it possible to prevent impact on the conformation of the shaft 311 due to the insertion of the sealing member 35. An additional benefit is that the shaft 311 of the rotor hub 31 can be rendered into a desired conformation even as the spaces on either side of the sealing member 35 in the through-hole 3110 are securely isolated from each other.

With the manufacturing method in the third embodiment, as is the case with the first embodiment, the conformational precision of the shaft 311 can be made high even in a manufacturing method that involves press-fitting the sealing member 35 into the through-hole 3110. In addition, the metal sealing member 35 makes it possible to securely isolate the spaces on either side (in FIG. 9E, to the left and right) of the sealing member 35 from each other. Accordingly, utilizing a thus-fashioned rotor hub 31 in the spindle motor for a disk-drive device more positively prevents lubricating oil and other matter in the interior of the motor from invading the space around the recording disk(s), which must be kept clean. A manufacturing method involving the third embodiment should be especially suited to the manufacture of rotor hubs 31 for motors furnished with a hydrodynamic pressure bearing.

With a manufacturing method involving the third embodiment, moreover, in the same way as with the first embodiment, impact on the conformation of the shaft 311 due to shrinking or other factors when the adhesive 351 cures can be prevented, while the through-hole 3110 can be more securely sealed by the adhesive 351. What is more, downsizing (in particular, flattening) of the rotor hub 31 and of a motor utilizing the rotor hub 31, and improvement in the precision with which the rotor hub 31 is machined can be realized. And precisional decline in the rotor hub 31 otherwise due to the added number of times that the rotor-hub forming material would be chucked is abated, as are cost increases, etc. owing to chucking operations.

While modes of embodying the present invention have been described above, the present invention is not limited to the foregoing embodiments, in that various modifications are possible.

Figure 10:
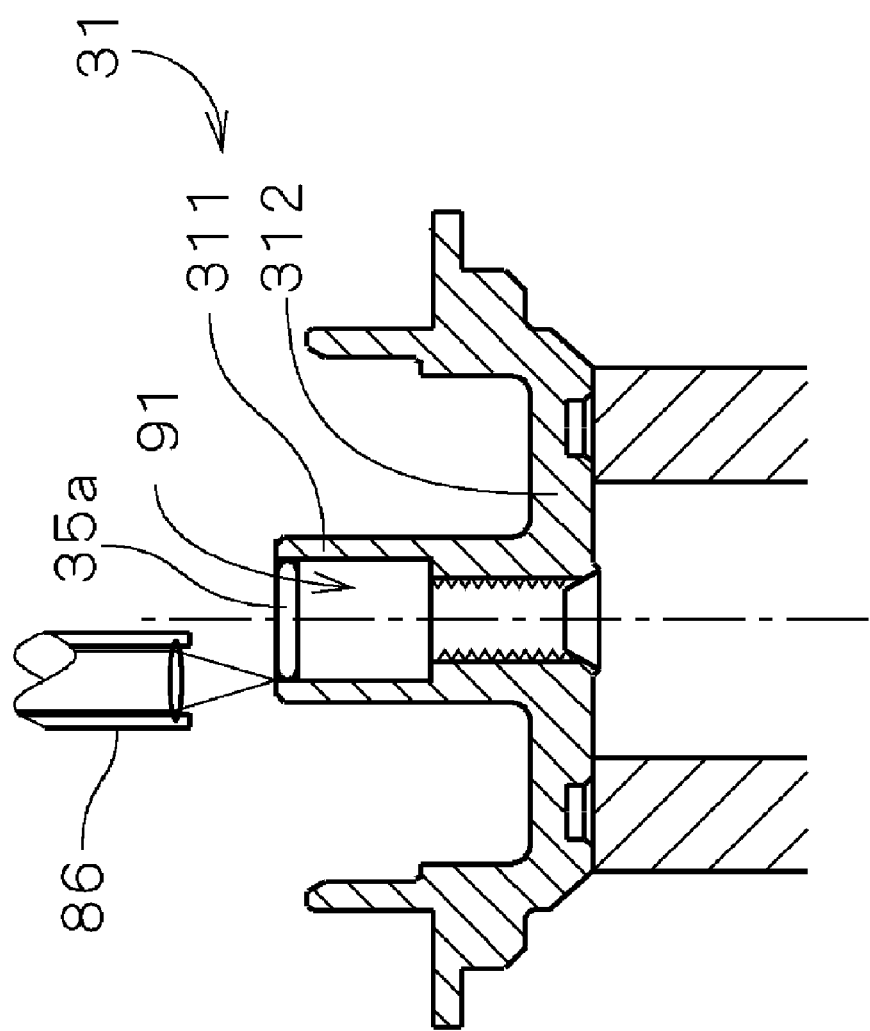
FIG. 10 is a section view representing a stage in the course of manufacturing a rotor hub involving a modified embodiment of the present invention.

In each embodiment described above, the form of the sealing member 35 is not limited to being globular; for example, a sealing member in a form such as discoid or circularly columnar may be press-fit into the hole 91 illustrated in FIG. 4E (or the through-hole 3110 illustrated in FIG. 9B). Furthermore, as represented in FIG. 10, with a discoid sealing member 35a having been press-fit into the mouth of the shaft 311 on the side opposite the circular plate part 312, instead of adhesive being supplied in between the sealing member 35a and the through-hole 3110, the sealing member 35a and the inner circumferential surface of the through-hole 3110 may be welded with a laser welding device 86. The spaces on either side of the sealing member 35a (top and bottom sides of the sealing member 35a in FIG. 10) are thereby more securely isolated from each other. Likewise, with a circularly columnar sealing member in lieu of the discoid sealing member 35a having been press-fit into the shaft 311, the sealing member and the inner circumferential surface of the through-hole 3110 may be welded. It will be appreciated that in implementations in which the spaces on either side of the sealing member 35 are sufficiently segregated without the adhesive 351 or without carrying out the welding operation, the supplying of adhesive 351, or the welding just described may be omitted.

The sealing member 35 is not limited to being metal; as long it as has a definite form the member may be, for example, a rubber substance such as acrylonitrile-butadiene rubber (NBR), a synthetic resin, or various other types of elastic or like material. In this respect, manufacturing methods involving the foregoing embodiments are especially suited to implementations in which the sealing of the through-hole 3110 in the shaft 311 is carried out by press-fitting a sealing member 35 having a definite form.

Figure 11:
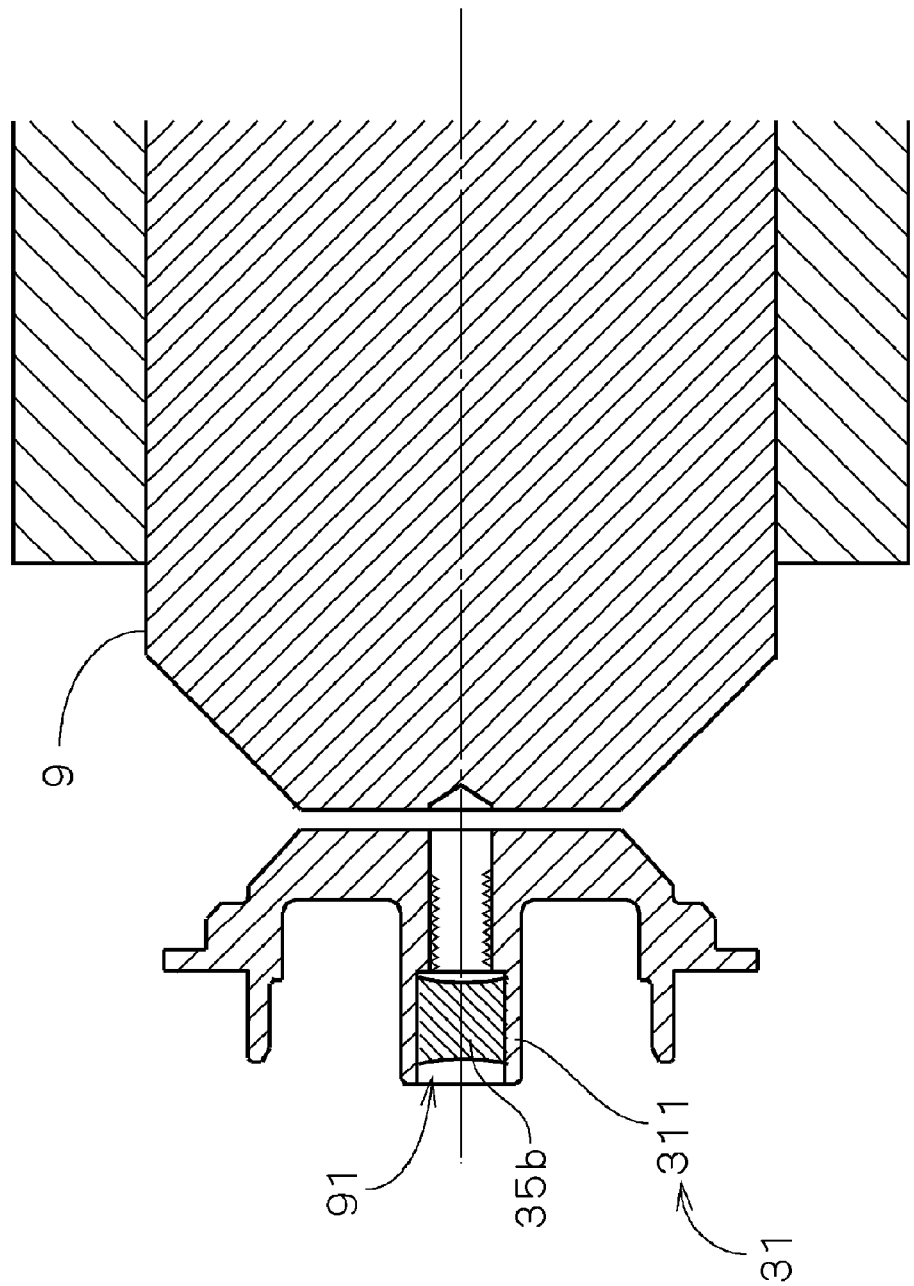
FIG. 11 is a section view representing a stage in the course of manufacturing a rotor hub involving another modified embodiment of the present invention.

In the rotor hub 31, it is not required that the sealing member 35 that is pres-fit into the hole 91 illustrated in FIG. 4E (or the through-hole depicted in FIG. 9B) necessarily have a definite form. For example, as indicated in FIG. 11, in place of the sealing member 35, by means of a sealing material 35b such as an adhesive supplied (i.e., inserted) into and fixed within the hole 91, the spaces on either side of the sealing material 35b (left and right sides of the sealing material 35b in FIG. 11) may be securely isolated from each other. In this case as well, because prior to forming the shaft 311 the sealing material 35b is supplied into the hole 91 and cured, impact on the conformation of the shaft 311 due to shrinking or other factors when the sealing material 35b cures can be prevented.

In each of the foregoing embodiments, methods of manufacturing a rotor hub 31 being a shaft unit that includes a shaft 311, a circular plate part 312, and a cylindrical part 313 have been described. Yet a manufacturing method involving any of the foregoing embodiments can also be applied to instances in which, for example, the base of a motor stationary section having a shaft is manufactured as a shaft unit.

Furthermore, the shaft unit need only include the shaft 311; thus, a manufacturing method involving the first embodiment is also applicable in implementations in which the shaft unit is the shaft 311 itself. In particular, the hole 91 would be formed in the workpiece 9 and the sealing member 35 press-fit into the hole 91 to create the internal space 91c. The shaft 311 would then be shaped by cutting work on the periphery of the workpiece 9 around the hole 91, and then would be cut away from the workpiece 9. Thereafter, a shaft 311 of desired conformation, yet in which the spaces on either side of the sealing member 35 are securely isolated form each other, would be shaped.

In another possible modification, a workpiece 9 in which a hole 91 has been preformed, or a pipe-shaped workpiece 9 in which a through-hole has been preformed may be retained by means of the chuck 81, to ready machining stock in which is formed a hole having a mouth on at least one side in the orientation along the center axis J2, in a state in which the stock is chucked in the chuck 81.

A further modification would be that in the third embodiment, a ring-shaped workpiece 9a in which the through-hole 3110 has been preformed may be retained by means of the chuck 81, to ready machining stock in which is formed a through-hole centering on the center axis J2, in a state in which the stock is chucked in the chuck 81.

It is not required that a motor involving any of the foregoing embodiments necessarily be a so-called inner-rotor type in which a field magnet 34 is disposed alongside the center axis J1 of the stator 24. For example, the motor may be an outer-rotor type in which the field magnet 34 is disposed along the outer side of the stator 24.

Also, the motor bearing mechanism may be, for example, ball bearings. In that case, the sealing member 35 would securely prevent the ball-bearing grease and like material from invading the space that must be kept clean around the recording disks 62.

The disk-drive device 60 having a motor involving any of the embodiments described above is not limited to being a hard-disk drive, and may be a disk-drive device such as a removable-disk drive.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method of manufacturing a shaft unit for a motor having a rotor supported by a radial fluid dynamic bearing mechanism that will surround the shaft unit, the method comprising:
   readying machining stock as a workpiece, wherein the machining stock has a hole which extends axially along a center axis of the stock and forms a first mouth in a first end of the stock, and the readying comprises chucking the workpiece in a state in which the workpiece is rotatable relative to a cutting tool about a first axis coincident with the center axis;
   inserting sealing material into the hole to seal the hole;
   subsequently machining the workpiece along the periphery thereof radially outwardly of the hole with the cutting tool to form a shaft having a central longitudinal axis that is coincident with the center axis; and
   transecting the workpiece along a boundary that passes through the center axis on an opposite side of the sealing material from where the first mouth is located to separate from the workpiece a shaft unit which includes the shaft and the sealing material.

2. A shaft-unit manufacturing method as set forth in claim 1, wherein the transecting is carried out along a boundary that extends through the hole such that a second mouth is formed in an end of the shaft unit opposite the end in which the first mouth is located.

3. A shaft-unit manufacturing method as set forth in claim 2, wherein the inserting comprises press-fitting a sealing member to the workpiece within the hole.

4. A shaft-unit manufacturing method as set forth in claim 3, wherein the machining also comprises forming a substantially discoid feature flaring perpendicularly with respect to the center axis from one end portion of the shaft.

5. A shaft-unit manufacturing method as set forth in claim 3, wherein the inserting comprises press-fitting a metal member to the workpiece within the hole.

6. A shaft-unit manufacturing method as set forth in claim 1, further comprising cutting the shaft unit axially through a second end of the shaft unit, opposite the end in which the first mouth is located, until at least a portion of the hole is reached to create a second mouth in the second end of the shaft unit.

7. A shaft-unit manufacturing method as set forth in claim 6, wherein the inserting comprises press-fitting a sealing member to the workpiece within the hole.

8. A shaft-unit manufacturing method as set forth in claim 7, wherein the inserting comprises press-fitting a metal member to the workpiece within the hole.

9. A shaft-unit manufacturing method as set forth in claim 1, wherein the inserting comprises press-fitting a sealing member to the workpiece within the hole.

10. A shaft-unit manufacturing method as set forth in claim 9, wherein the inserting comprises press-fitting a metal member to the workpiece within the hole.

11. A shaft-unit manufacturing method as set forth in claim 10, further comprising supplying an adhesive up against the sealing member in the hole, and curing the adhesive before the workpiece is machined to form the shaft.

12. A shaft-unit manufacturing method as set forth in claim 9, further comprising supplying an adhesive up against the sealing member in the hole, and curing the adhesive before the workpiece is machined to form the shaft.

13. A shaft-unit manufacturing method as set forth in claim 9, wherein the hole has a round cross section; and the inserting comprises press-fitting a globular sealing member to the workpiece within the hole.

14. A shaft-unit manufacturing method as set forth in claim 9, wherein the hole has a rounded cross section; and the inserting comprises press-fitting a discoid or columnar sealing member to the workpiece within the hole.

15. A method of manufacturing a shaft unit for a motor having a rotor supported by a radial fluid dynamic bearing mechanism that will surround the shaft unit, the method comprising:
   readying machining stock as a workpiece, wherein the machining stock has a through-hole which extends axially through the stock along a center axis of the stock, and the readying comprises chucking the workpiece in a state in which the workpiece is rotatable relative to a cutting tool about a first axis coincident with the center axis;
   inserting sealing material into the hole to seal the hole; and
   subsequently machining the workpiece along the periphery thereof radially outwardly of the hole to form a shaft whose central longitudinal axis is coincident with the center axis, and thereby produce a shaft unit from a single piece of stock.

16. A shaft-unit manufacturing method as set forth in claim 15, wherein the inserting comprises press-fitting a sealing member to the workpiece within the through-hole.

17. A shaft-unit manufacturing method as set forth in claim 16, wherein the inserting comprises press-fitting a metal member to the workpiece within the through-hole.

18. A shaft-unit manufacturing method as set forth in claim 17, further comprising supplying an adhesive up against the sealing member in the through-hole, and curing the adhesive before the workpiece is machined to form the shaft.

19. A shaft-unit manufacturing method as set forth in claim 16, further comprising supplying an adhesive up against the sealing member in the through-hole, and curing the adhesive before the workpiece is machined to form the shaft.

20. A shaft-unit manufacturing method as set forth in claim 16, wherein the machining also comprises forming a substantially discoid feature flaring perpendicularly with respect to the center axis from one end portion of the shaft.

* * * * *